(12) United States Patent
Yoshizaki et al.

(10) Patent No.: US 9,287,052 B2
(45) Date of Patent: Mar. 15, 2016

(54) ADDITIVES FOR DYE-SENSITIZED SOLAR CELLS

(71) Applicant: MERCK PATENT GMBH, Darmstadt (DE)

(72) Inventors: Hiroki Yoshizaki, Tokyo (JP); Kentaro Kawata, Kanagawa Pref. (JP); Tomohisa Goto, Sagamihara (JP); Hiromi Shinohara, Kanagawa Pref. (JP); Peter Kirsch, Seeheim-Jugenheim (DE)

(73) Assignee: Merck Patent GmbH, Darmstadt (DE)

( * ) Notice: Subject to any disclaimer, the term of this patent is extended or adjusted under 35 U.S.C. 154(b) by 73 days.

(21) Appl. No.: 13/901,821

(22) Filed: May 24, 2013

(65) Prior Publication Data

US 2013/0292601 A1    Nov. 7, 2013

Related U.S. Application Data

(63) Continuation of application No. PCT/EP2011/005622, filed on Nov. 9, 2011.

(30) Foreign Application Priority Data

Dec. 8, 2010 (EP) .................. 10015437

(51) Int. Cl.
  *H01G 9/022* (2006.01)
  *H01G 9/20* (2006.01)

(52) U.S. Cl.
  CPC ............. *H01G 9/038* (2013.01); *H01G 9/2031* (2013.01); *H01G 9/2013* (2013.01); *H01G 9/2059* (2013.01); *Y02E 10/542* (2013.01)

(58) Field of Classification Search
  CPC .... Y02E 10/542; H01G 9/038; H01G 9/2031; H01G 9/2013; H01G 9/2059
  USPC ....................... 252/622; 548/304.4
  See application file for complete search history.

(56) References Cited

U.S. PATENT DOCUMENTS

| | | | |
|---|---|---|---|
| 2005/0150544 A1 | 7/2005 | Fukui et al. | |
| 2007/0295957 A1* | 12/2007 | Lee et al. | 257/40 |
| 2011/0210282 A1* | 9/2011 | Foley | 252/62.51 R |
| 2012/0001163 A1 | 1/2012 | Kobayashi et al. | |

FOREIGN PATENT DOCUMENTS

| | | |
|---|---|---|
| JP | 2006-202646 A1 | 8/2006 |
| WO | 2006/124389 A2 | 11/2006 |
| WO | 2010100929 A1 | 9/2010 |

OTHER PUBLICATIONS

Takahashi ("Benzimidazole N-oxides. I. The structure of benzimidazole N-oxide synthesis of its derivatives" in Chem. Pharm. Bull. (1963), 11(11), 1375-1381).
Nikitina ("Imidazole and Benzimidazole N-oxides" in Chem. Heterocycl. Comp. (1983), 29(2), 127-151).
Schulenberg ("Preparation of benzimidazole N-oxides by catalytic hydrogenation" in J. Chem. Eng. Data (1968), 13(4), 574-575).
Xiong ("Synthesis of pyridine derivatives and their influence as additives on the photocurrent of dye-sensitized solar cells" in J. Appl. Electrochem. (2008), 39(1), 147-154).
Fielden ("A new and simple synthesis of benzimidazole N-oxides" in J. Chem. Soc. Chem. Comm. (1969), 772-773).
Fei ("A supercooled imidazolium iodide ionic liquid as a low-viscosity electrolyte for dye-sensitized solar cells" in Inorg. Chem. (2006), 45(26), 10407-10409).
Nazeeruddin ("Conversion of Light to Electricity by cis-X2Bis(2,2'-bipyridyl-4,4'-dicarboxylate)ruthenium(II) charge-transfer sensitizers (X=Cl-, Br-, I-, Cn-, and Scn-) on Nanocrystalline TiO2 Electrodes" in J. Am. Chem. Soc. (1993) 115, 6382-6390).
Kusama (Influence of nitrogen-containing heterocyclic additives in I-/I3-redox electrolytic solution on the performance of Ru-dye-sensitized nanocrystalline TiO2 Solar Cell in J. Photochem. Photobiol. (2005), 169, 169-176).
Voskresensky et al. ("Selective One-Pot N-Monomethylation of 2-Nitroanilines under Ptc Conditions", in Synth. Comm. (2000), 30:19, 3523-3526).
Katritzky et al. ("Synthesis and NMR-spectral characterization of N,N-dialky1-3-nitroanilines, N,N-dialkyl-1,3-benzenediamines and their acyl derivatives", Recueil des Travaux Chimiques de Pays-Bas (1990), 109(5), 337-345).
TW Search Report for Corresponding Application TW 100145142, Mar. 20, 2015.
Office Action, TW Intellectual Property Office for Corresponding Application TW 100145142, Mar. 20, 2015.

\* cited by examiner

*Primary Examiner* — Ling Choi
*Assistant Examiner* — Catherine S Branch
(74) *Attorney, Agent, or Firm* — Rick Matos; Innovar, L.L.C.

(57) ABSTRACT

The present invention relates to the use of at least one tertiary amine-N-oxide of formula I as additive in dye-sensitized solar cells and to special electrolyte formulations and a dye-sensitized solar cell comprising at least one compound of formula I.

15 Claims, No Drawings

ADDITIVES FOR DYE-SENSITIZED SOLAR CELLS

CROSS-REFERENCE TO EARLIER FILED APPLICATIONS

The present application claims the benefit of and is a continuation of international application No. PCT/EP2011/005622, filed Nov. 9, 2011, which claims the benefit of European Application EP 10015437.6, filed Dec. 8, 2010, the entire disclosures of which are hereby incorporated by reference.

FIELD OF THE INVENTION

The present invention relates to the use of at least one tertiary amine-N-oxide of formula I including all tautomeric or stereoisomeric forms corresponding to said formula I as additive in dye-sensitized solar cells (DSSC) and to special electrolyte formulations and a dye-sensitized solar cell comprising at least one compound of formula I.

BACKGROUND OF THE INVENTION

Dye-sensitized solar cells utilizing a sensitizer dye have attracted wide attention. Dye-sensitized solar cells include, for example, a transparent conductive film, a porous semiconductor electrode having a sensitizing dye supported therein, a hole transport layer, and a counter electrode formed in this order on a transparent substrate.

An example of such cells is described in literature: O'Regan, B. and Grätzel, M. (1991) *Nature*, 353, 737. The solar cell contains, in this case, a pair of opposite electrodes (an anode and a cathode) and an electrolyte in between them. The electrolyte includes iodide ion couples having different oxidation states as a mediator of holes generated upon charge separation at the dye-sensitized nanoporous semiconductor-electrolyte interface. The cathode is made of a conductive material whilst the anode is made of a plate of transparent materials such as glass having on its surface a transparent conductive layer of light-transmitting tin dioxide ($SnO_2$) which might be doped with another element and also a semiconducting titanium dioxide ($TiO_2$) layer thereon. The $TiO_2$ layer is formed with a $TiO_2$ semiconductor consisting of nanocrystalline particles, to the surface of which sensitizing dyes are attached. When the interface between the $TiO_2$ nanocrystalline layer and dyes is irradiated, electrons are injected to $TiO_2$. On the other hand, the mediator undergoes oxidation within the electrolyte; three iodide ions ($I^-$) eject two electrons, resulting in triiodide ions ($I_3^-$) of high oxidation degree. The electrons are then transported through the $TiO_2$ nanocrystalline layer and collected by the transparent conductive layer whilst the triiodide ions ($I_3^-$) diffuse to the cathode, and obtain two electrons to be reduced into the iodide ions ($I^-$). Thus, this type of wet cell converts solar energy into electric energy.

Dye-sensitized solar cells have been expected to serve as a solar cell for the next generation because of simplicity and convenience of fabrication methods thereof, reduced material costs therefore and the like.

In order for dye-sensitized solar cells to be put in practical use, there has been a demand for further improvement in conversion efficiency, and for that, there has been a demand for an increase in the current to be generated (short-circuit current, $J_{sc}$), in open-circuit voltage ($V_{oc}$) as well as in safety and durability.

The dye-sensitized solar cells that perform best presently contain at least one volatile organic solvent to reduce the viscosity of the electrolyte, thus to enhance the ion mobility. The greatest challenge here is to remove or reduce the volatility of electrolytes by replacing the volatile solvent with ionic liquids with the goal that the electrolyte liquid composes only of ions such as disclosed e.g. in Yu Bai et al., "High-performance dye-sensitized solar cells based on solvent-free electrolytes produced from eutectic melts", *Nature Materials* 2008, 1.

One of the factors that limits the power conversion efficiency of ionic liquid-based DSSC may be the much larger extent of recombination of the injected electron in the semiconductor or conduction band electrons (e.g. $TiO_2$) due to the much larger amount of the oxidized part of the redox couple (e.g. $I_3^-$) at the relevant operating condition. In order to increase the open-circuit voltage, it is necessary to avoid such recombination which means in other words to suppress the leakage current at the semiconductor electrolyte junction.

The leakage current arises from the described reduction of triiodide by conduction band electrons ($e^-_{cb}$):

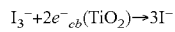

$$I_3^- + 2e^-_{cb}(TiO_2) \rightarrow 3I^-$$

which occurs despite the fact that the $TiO_2$ surface is covered by a monolayer of the dye. The triiodide, due to its relatively small size, either crosses the dye layer or has access to nanometersized pores onto which the dye cannot completely cover, i.e. where the surface of $TiO_2$ is bare and exposed to redox electrolyte.

Typically, recombination is suppressed by addition of compounds which are considered to be coordinated to free sites on the $TiO_2$ surface, thus blocking the access of triiodide or free iodine to potential recombination sites. Examples of compounds typically used for this purpose are (poly)ether derivatives, amides, esters, nitriles. The currently best results have been achieved using N-alkyl-benzimidazoles (Zhaofu Fei et al., *Inorg. Chem.* 2006, 45, 10407-10409, A Supercooled Imidazolium Iodide Ionic Liquid as a Low-Viscosity Electrolyte for Dye-Sensitized Solar Cells), 4-tert-butylpyridine (TBP, M. K. Nazeeruddin et al., *J. Am. Chem. Soc.* 1993, 115, 6382-6390) or nitrogen containing heterocyclic additives such as tetrazole, pyrazole, triazole, pyrazine, pyrimidine, triazine (H. Kusama et al., *J. Photochem. Photobiol., A Chemistry*, 2005, 169-176). TBP and the nitrogen containing heterocyclic additives are described as useful especially in electrolytes comprising at least one volatile organic solvent.

It is believed that the donating properties of the nitrogen lone pair in the heterocyclic additives known so far are responsible for the enhanced $V_{oc}$.

US 2005/0150544 describes a dye-sensitized solar cell wherein the used dye is Ruthenium 535-bisTBA dye, made by Solaronix Col, Swiss and the electrolytic solution based on acetonitrile contains a heterocyclic compound containing an oxygen atom in the ring, such as tetrahydrofuran, 2-methyltetrahydrofuran, pyran, tetrahydropyran, furan, 2-methyl-furan, 1,4-dioxane, trioxane, 4-methyl-1,3-dioxolane, 1,3-dioxolane, 1,3-dioxane, 2H-1,3-dioxole, 3H-1,2-dioxole, dioxene, 1,4-dioxin, trioxane, and the concentration of the heterocyclic compound in the electrolytic solution is 5 to 40% by volume.

When TBP is used, a poisoning against the counter electrode is observed. In addition, TBP is volatile which means it influences the stability and durability of the device.

When other heterocyclic additives are used, a marked decrease in short-circuit current is observed, and the actually obtained open-circuit voltage is low.

However, there continues to be a demand for new and/or improved additives which are able to improve open circuit voltage by shifting the conduction bandedge of oxide semiconductor in a negative direction and/or by reducing the leakage current and therefore maximising the maximum power-operating voltage. The open circuit voltage is one important parameter which needs to be tuned in achieving improved DSC efficiency over a broad temperature range including temperatures above room temperature and well below the temperature at which dye desorption may take place (i.e. in the range of 40° C. to 120° C.)).

JP 2006/202646 mentions 4-phenyl-pyridine-N-oxide as possible additive in electrolytes for various devices for instance lithium secondary batteries, electrolytic condenser, electric double layer capacitor etc. It is mentioned that electrolytes containing the additives according to JP 2006/202646 including accidentally 4-phenyl-pyridine-N-oxide can demonstrate heat resistance and no colour change while heating. There is no hint that tertiary N-oxides according to formula I may advantageously be used in dye-sensitized solar cells and that they have the capability to increase the $V_{oc}$.

SUMMARY OF THE INVENTION

The objective of the invention is therefore to provide alternative and/or improved compounds as additives for dye-sensitized solar cells which act as recombination inhibitor and/or as an agent to induce the conduction bandedge shift of the porous semiconductor, preferably to induce that of $TiO_2$. Surprisingly it was found that special tertiary N-oxides fulfill such demands.

Electrolyte formulations according to the invention comprise the inventive additives of formula I, as described or preferably described herein, as alternatives or improvements to already known electrolyte formulations in the field of electrolyte formulations for dye sensitised solar cells. In using the inventive additives, such electrolyte formulations show comparable or increased power conversion efficiencies avoiding disadvantages of currently known additives e.g. tert-butyl-pyridine. The inventive additives of formula I as described or preferably described herein increase the open circuit voltage ($V_{oc}$) and thus power conversion efficiency of the dye-sensitized solar cell as defined herein.

It is believed that tertiary N-oxides of formula I act as recombination inhibitors and/or as agents to induce the conduction bandedge shift of the porous semiconductor resulting in an increase of the open circuit voltage ($V_{oc}$). The tertiary N-oxides of formula I therefore act as additives which are able to reduce the leakage current and to enhance the conduction bandedge, both leading to the increase of $V_{OC}$.

The present invention therefore relates firstly to the use of at least one compound of formula I

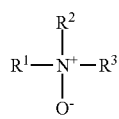

I in which
$R^1$, $R^2$, $R^3$ independently of each other are:
straight-chain or branched alkyl with 1 to 20 C atoms, which can be substituted by at least one R; or
aryl with 6 to 10 C atoms, which can be substituted by at least one R; or $R^1$, $R^2$ and $R^3$ are fused to form a heteroaromatic ring structure in which 1, 2 or 3 N atoms or 1N atom and 1 S or 1 O atom are present which can be substituted by at least one R; or $R^1$ and $R^2$ are fused to form a heteroaliphatic ring structure in which 1, 2 or 3 N atoms or 1N atom and 1 S or 1 O atom are present which can be substituted by at least one R and $R^3$ is straight-chain or branched alkyl with 1 to 20 C atoms or fused to form a tricyclic structure containing at least 1 N atom and in which a second or third N atom of the heteroaliphatic ring structure or tricyclic ring structure may be substituted by —O$^-$ and a straight-chain or branched alkyl with 1 to 20 C-atoms and R is independently at each occurrence: Hal; CN; C(O)H; straight-chain or branched alkyl with 1 to 20 C atoms, which can be substituted by cycloalkyl having 5 to 6 C atoms or aryl having 6 to 10 C atoms in which the aryl group may be substituted by straight-chain or branched alkyl groups or alkoxy groups with 1 to 4 C atoms or by heteroaryl having 5 or 6 C atoms; straight-chain or branched alkenyl with 2 to 20 C atoms, which can be substituted by aryl having 6 to 10 C atoms in which the aryl group may be substituted by straight-chain or branched alkyl groups with 1 to 4 C atoms; cycloalkyl having 5 or 6 C atoms; straight-chain or branched hydroxyalkyl with 1 to 20 C atoms; straight-chain or branched alkoxy with 1 to 20 C atoms, which can be substituted by aryl having 6 to 10 C atoms; straight-chain or branched alkylthio with 1 to 20 C atoms; aryl with 6 to 10 C atoms in which the aryl group may be substituted by straight-chain or branched alkyl groups or alkoxy groups with 1 to 4 C atoms or by heteroaryl having 5 or 6 C atoms; heteroaryl with 5 to 10 C atoms in which a N atom of the heteroaryl group may be substituted by —O"; aryloxy with 6 to 10 C atoms; arylthio with 6 to 10 C atoms; or straight-chain or branched alkylamino or dialkylamino with 1 to 20 C atoms;

Hal is F, Cl, Br or I, including all tautomeric or stereoisomeric forms thereof, as additive in dye-sensitized solar cells.

The at least one compound of formula I can be applied according to the invention as component of the electrolyte, as co-adsorbent during dye application or by other methods. Preferably, the at least one compound of formula I is applied as component of the electrolyte or as co-adsorbent, particularly preferred as component of the electrolyte.

The at least one compound of formula I as described above can be used as single additive or in combination with other known additives such as (poly)ether derivatives, amides, esters, nitriles or heterocyclic compounds as mentioned above.

The kind of electrolyte useful in the given devices such as the dye-sensitized solar cell is not limited. The electrolytes may be based on molecular solvents or on organic salts, commonly described as molten salts or ionic liquids. It is preferred to use the N-oxides of formula I as described above in electrolytes which do not contain highly volatile molecules such as low molecular weight organic solvents.

The present invention relates furthermore to an electrolyte formulation comprising at least one compound of formula I as described above or preferably described together with redox active species.

The present invention relates furthermore to a dye-sensitized solar cell comprising at least one compound of formula I as described or preferably described herein.

The present invention relates further to the use of the electrolyte formulation as described herein in a dye-sensitized solar cell.

DETAILED DESCRIPTION OF THE INVENTION

A straight-chain or branched alkyl group having 1 to 20 C atoms is, for example, methyl, ethyl, propyl, isopropyl, n-butyl, sec.-butyl, tert.-butyl, 1-(2,2-dimethyl)-propyl, pentyl, hexyl, heptyl, octyl, x-methylbutyl with x being 1; 2 or 3, x-methylpentyl with x being 1; 2; 3 or 4, x-methylhexyl with x being 1; 2; 3; 4 or 5, x-ethylpentyl with x being 1, 2 or 3, x-ethylhexyl with x being 1; 2; 3 or 4, n-nonyl, n-decyl, n-undecyl, n-dodecyl, n-tridecyl, n-tetradecyl, n-pentadecyl, n-hexadecyl, n-heptadecyl, n-octadecyl, n-nonadecyl and n-eicosyl, which can be substituted by at least one R being defined below.

Aryl with 6 to 10 C atoms is an aromatic compound, for example phenyl, naphthyl or anthracenyl, which can be substituted by at least one R being defined below. Preferably aryl is phenyl, which can be substituted by at least one R.

Heteroaryl with 5 or 6 C atoms are for example 2- or 3-furyl, 2- or 3-thienyl, 1-, 2- or 3-pyrrolyl, 1-, 2-, 4- or 5-imidazolyl, 3-, 4- or 5-pyrazolyl, 2-, 4- or 5-oxazolyl, 3-, 4- or 5-isoxazolyl, 2-, 4- or 5-thiazolyl, 3-, 4- or 5-isothiazolyl, 2-, 3- or 4-pyridyl, 2-, 4-, 5- or 6-pyrimidinyl, 1,2,3-triazol-1-, -4- or -5-yl, 1,2,4-triazol-1-, -4- or -5-yl, 1- or 5-tetrazolyl, 1,2,3-oxadiazol-4- or -5-yl 1,2,4-oxadiazol-3- or -5-yl, 1,3,4-thiadiazol-2- or -5-yl, 1,2,4-thiadiazol-3- or -5-yl, 1,2,3-thiadiazol-4- or -5-yl, 2-, 3-, 4-, 5- or 6-2H-thiopyranyl, 2-, 3- or 4-4H-thiopyranyl, 3- or 4-pyridazinyl or pyrazinyl. Preferably, heteroaryl is 2-, 3- or 4-pyridyl.

Heteroaromatic ring structures in which 1, 2 or 3 N atoms are present or 1 N and 1 S or 1 O atom are present are for example pyrrole, imidazole, pyrazol, triazol, pyridine, pyridazine, pyrimidine, pyrazine, thiazole, oxazole, indole, quinoline, quinoxaline or benzimidazole, which can be substituted by at least one R being defined below. Preferably, the heteroaromatic ring structure is pyridine, pyrazine, imidazole, benzimidazole or quinoline, which can be substituted by at least one R being defined below. Examples of compounds of formula I having heteroaromatic ring structures useful according to the invention are represented by the compounds of formulae IIa, IIb, IIc, IId, IIe, IIf and IIg

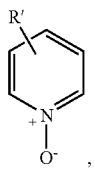

IIa

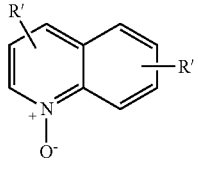

IIb

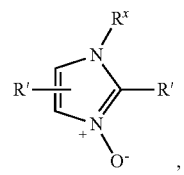

IIc

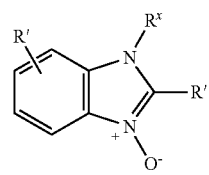

IId

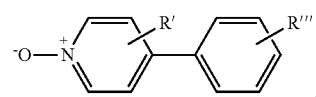

IIe

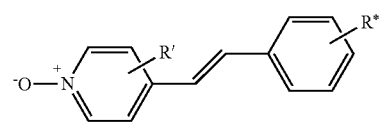

IIf

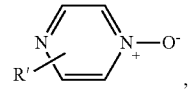

IIg in which R' is independently H or R;

R''' is independently H, straight-chain or branched alkyl or alkoxy with 1 to 4 C atoms or heteroaryl having 5 or 6 C atoms;

R* is independently H, straight-chain or branched alkyl having 1 to 4 C atoms;

$R^x$ is independently H, straight-chain or branched alkyl with 1 to 20 C atoms, which can be substituted by cycloalkyl having 5 to 6 C atoms or aryl having 6 to 10 C atoms in which the aryl group may be substituted by straight-chain or branched alkyl groups or alkoxy groups with 1 to 4 C atoms or by heteroaryl having 5 or 6 C atoms; and R is defined as herein.

Heteroaliphatic ring structures in which 1, 2 or 3 N atoms or 1 N atom and 1 S or 1 O atom are present are for example pyrrolidine, imidazolidine, piperidine, piperazine, hexahydro-pyrimidine, hexahydro-pyridazine, 1,3,5-triazinane, morpholine, thiomorpholine, oxazolidine, thiazolidine, which can be substituted by at least one R being defined below. Preferably, the heteroaliphatic ring structure is pyrrolidine, piperidine, morpholine, oxazolidine or hexahydropyridazine, which can be substituted by at least one R being defined below. Examples of compounds of formula I having such heteroaliphatic ring structures useful according to the invention are represented by the compounds of formulae IIIa, IIIb or IIIc

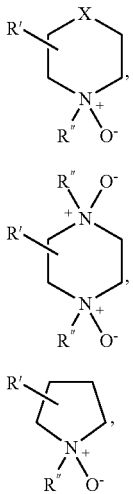

in which X is CH$_2$, O or NR, R" is straight-chain or branched alkyl with 1 to 20 C atoms, R' is H or R and R is defined below.

Heteroaliphatic tricyclic ring structures with at least one N-atom are for example 1-aza-bicyclo[3.2.1]octane, 1-aza-bicyclo[2.2.2]octane, 1,4-diaza-bicyclo[2.2.2]octane, which can be substituted by at least one R being defined below. Examples of compounds of formula I having such heteroaliphatic tricyclic ring structures are represented by the compounds of formula IIId

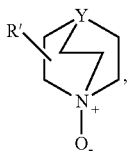

in which Y is CH, N, N$^+$R, N$^+$—O$^-$, R' is H or R and R is defined below.

R is independently at each occurrence: Hal; CN; C(O)H; straight-chain or branched alkyl with 1 to 20 C atoms, which can be substituted by cycloalkyl having 5 to 6 C atoms or aryl having 6 to 10 C atoms in which the aryl group may be substituted by straight-chain or branched alkyl groups or alkoxy groups with 1 to 4 C atoms or by heteroaryl having 5 or 6 C atoms; straight-chain or branched alkenyl with 2 to 20 C atoms, which can be substituted by aryl having 6 to 10 C atoms in which the aryl group may be substituted by straight-chain or branched alkyl groups with 1 to 4 C atoms; cycloalkyl having 5 or 6 C atoms; straight-chain or branched hydroxyalkyl with 1 to 20 C atoms; straight-chain or branched alkoxy with 1 to 20 C atoms, which can be substituted by aryl having 6 to 10 C atoms; straight-chain or branched alkylthio with 1 to 20 C atoms; aryl with 6 to 10 C atoms in which the aryl group may be substituted by straight-chain or branched alkyl groups or alkoxy groups with 1 to 4 C atoms or by heteroaryl having 5 or 6 C atoms; heteroaryl with 5 to 10 C atoms in which a N atom of the heteroaryl group may be substituted by —O"; aryloxy with 6 to 10 C atoms; arylthio with 6 to 10 C atoms; or straight-chain or branched alkylamino or dialkylamino with 1 to 20 C atoms, wherein Hal is F, Cl, Br or I.

Hal is preferably F, Cl or I.

Straight-chain or branched alkyl groups with 1 to 20 C atoms are described as examples above which can be substituted by aryl having 6 to 10 C atoms such as phenyl, naphthyl or anthracenyl which may be substituted by straight-chain or branched alkyl groups or alkoxy groups with 1 to 4 C atoms or which can be substituted by heteroaryl having 5 or 6 C atoms as described above. Preferably, straight-chain or branched alkyl groups substituted by aryl are benzyl, 1-(4-methoxy)-phenyl, 1-(4-methyl)-phenyl, 2-phenylethyl, 3-phenylpropyl, 1-(2-phenyl)propyl, 4-phenylbutyl or 5-phenylpentyl, particularly preferably benzyl, 1-(4-methoxy)-phenyl, 3-phenylpropyl or 1-(2-phenyl)propyl.

Preferably, straight-chain or branched alkyl groups substituted by heteroaryl are 1-pyridine-4-yl-methyl. In addition, an N atom of the heteroaryl part may be substituted by —O$^-$.

Preferably, straight-chain or branched alkyl groups substituted by cycloalkyl having 5 to 6 C atoms are cyclopentyl-methyl, cyclopentyl-ethyl, cyclohexyl-methyl or cyclohexyl-ethyl.

Straight-chain or branched alkoxyl groups with 1 to 20 C atoms are defined as O-alkyl, in which alkyl is for example: methyl; ethyl; propyl; isopropyl; n-butyl; sec.-butyl; tert.-butyl; pentyl; hexyl; heptyl; octyl; x-methylbutyl with x being 1, 2 or 3; x-methylpentyl with x being 1, 2, 3 or 4; x-methylhexyl with x being 1, 2, 3, 4 or 5; x-ethylpentyl with x being 1, 2 or 3; x-ethylhexyl with x being 1, 2, 3 or 4; nonyl; decyl; undecyl; dodecyl; tridecyl; tetradecyl; pentadecyl; hexadecyl; heptadecyl; octadecyl; nonadecyl; or eicosyl; wherein the straight-chain or branched alkoxyl groups can be substituted by aryl having 6 to 10 C atoms such as phenyl, naphthyl or anthracenyl. Preferably, straight-chain or branched alkoxy groups substituted by aryl are phenylmethoxy, phenylethoxy, phenylpropoxy or phenylbutoxy, particularly preferably phenylmethoxy.

Cycloalkyl with 5 to 6 C atoms is cyclopentyl or cyclohexyl, preferably cyclohexyl.

Straight-chain or branched hydroxyalkyl groups with 1 to 20 C atoms are straight-chain or branched alkyl groups with 1 to 20 C atoms in which at least one H is substituted by a hydroxy group.

Straight-chain or branched alkylthio groups with 1 to 20 C atoms are defined as S-alkyl, in which alkyl is for example: methyl; ethyl; propyl; isopropyl; n-butyl; sec.-butyl; tert.-butyl; pentyl; hexyl; heptyl; octyl; x-methylbutyl with x being 1, 2 or 3; x-methylpentyl with x being 1, 2, 3 or 4; x-methylhexyl with x being 1, 2, 3, 4 or 5; x-ethylpentyl with x being 1, 2 or 3; x-ethylhexyl with x being 1, 2, 3 or 4; nonyl; decyl; undecyl; dodecyl; tridecyl; tetradecyl; pentadecyl; hexadecyl; heptadecyl; octadecyl; nonadecyl; or eicosyl.

Aryloxy groups with 6 to 10 C atoms are defined as O-Aryl, in which Aryl has the meaning as defined above.

Heteroaryl with 5 to 10 C atoms are for example: 2- or 3-furyl; 2- or 3-thienyl; 1-, 2- or 3-pyrrolyl; 1-, 2-, 4- or 5-imidazolyl; 3-, 4- or 5-pyrazolyl; 2-, 4- or 5-oxazolyl; 3-, 4- or 5-isoxazolyl; 2-, 4- or 5-thiazolyl; 3-, 4- or 5-isothiazolyl; 2-, 3- or 4-pyridyl; 2-, 4-, 5- or 6-pyrimidinyl. Heteroaryl is furthermore preferably: 1,2,3-triazol-1-, -4- or -5-yl; 1,2,4-triazol-1-, -4- or -5-yl; 1- or 5-tetrazolyl; 1,2,3-oxadiazol-4- or -5-yl; 1,2,4-oxadiazol-3- or -5-yl; 1,3,4-thiadiazol-2- or -5-yl; 1,2,4-thiadiazol-3- or -5-yl; 1,2,3-thiadiazol-4- or -5-yl; 2-, 3-, 4-, 5- or 6-2H-thiopyranyl; 2-, 3- or 4-4H-thiopyranyl; 3- or 4-pyridazinyl; pyrazinyl, 2-, 3-, 4-, 5-, 6- or 7-benzofuryl; 2-, 3-, 4-, 5-, 6- or 7-benzo-thienyl; 1-, 2-, 3-, 4-, 5-, 6- or 7-1H-indolyl; 1-, 2-, 4- or 5-benzimidazolyl; 1-, 3-, 4-, 5-, 6- or 7-benzopyrazolyl; 2-, 4-, 5-, 6- or 7-benzoxazolyl; 3-, 4-, 5-, 6- or 7-benzisoxazolyl; 2-, 4-, 5-, 6- or 7-benzothiazolyl; 2-, 4-, 5-, 6- or 7-benzisothiazolyl; 4-, 5-, 6- or 7-benz-2,1,3-oxadiazolyl; 1-, 2-, 3-, 4-, 5-, 6-, 7- or 8-quinolinyl; 1-, 3-, 4-, 5-, 6-, 7- or 8-isoquinolinyl; 1-, 2-, 3-, 4- or 9-carbazolyl; 1-, 2-, 3-, 4-, 5-, 6-, 7-, 8- or 9-acridinyl; 3-, 4-, 5-, 6-, 7- or 8-cinnolinyl; or 2-, 4-, 5-, 6-, 7- or 8-quinazolinyl.

In one preferred embodiment of the invention, compounds of formula I shall be used according to the invention, in which:

$R^1$, $R^2$ and $R^3$ are independently of each other straight-chain or branched alkyl with 1 to 20 C atoms, preferably straight-chain or branched alkyl with 1 to 9 C atoms, especially preferably methyl or nonyl; or in which $R^1$, $R^2$ and $R^3$ are fused to form a heteroaromatic ring structure in which 1, 2 or 3 N atoms or 1N and 1 S or 1 O atom are present which can be substituted by at least one R, preferably fused to form a heteroaromatic ring structure in which 1 or 2 N atoms are present which can be substituted by at least one R, or $R^1$ and $R^2$ are fused to form a heteroaliphatic ring structure in which 1, 2 or 3 N atoms or 1N atom and 1 S or 1 O atom are present which can be substituted by at least one R, and $R^3$ is straight-chain or branched alkyl with 1 to 20 C atoms, preferably fused to form a heteroaliphatic ring structure in which 1 or 2 N atoms or 1N atom and 1 O atom are present which can be substituted by at least one R, and $R^3$ is straight-chain or branched alkyl with 1 to 4 C atoms; and and R has a meaning as defined above or has a preferred meaning as defined below.

R is independently at each occurrence preferably: straight-chain or branched alkyl with 1 to 20 C atoms, which can be substituted by cycloalkyl having 5 to 6 C atoms or aryl having 6 to 10 C atoms in which the aryl group may be substituted by straight-chain or branched alkyl groups or alkoxy groups with 1 to 4 C atoms or by heteroaryl having 5 or 6 C atoms; straight-chain or branched alkenyl with 1 to 20 C atoms, which can be substituted by aryl having 6 to 10 C atoms in which the aryl group may be substituted by straight-chain or branched alkyl groups with 1 to 4 C atoms; aryl with 6 to 10 C atoms in which the aryl group may be substituted by straight-chain or branched alkyl groups or alkoxy groups with 1 to 4 C atoms or by heteroaryl having 5 or 6 C atoms; or dialkylamino with 1 to 20 C atoms.

R is independently at each occurrence particularly preferably straight-chain or branched alkyl with 1 to 20 C atoms, which can be substituted by aryl having 6 to 10 C atoms or straight-chain or branched dialkylamino with 1 to 20 C atoms.

Dialkylamino with 1 to 20 C atoms is defined as a dialkylamino group in which each alkyl group is independently of each other straight-chain or branched alkyl having 1 to 20 C atoms as defined before.

Within the definition of R, the unsubstituted straight-chain or branched alkyl groups having 1 to 20 C atoms are preferably methyl, n-butyl, tert.-butyl or 1-(2,2-dimethyl)-propyl.

Within the definition of R, the dialkylamino group has preferably alkyl groups which are independently of each other straight-chain or branched alkyl having 1 to 4 C atoms, especially preferably methyl groups.

Compounds of formula IIa are preferred in which R' is located in the 4 position of the pyridine ring. R' is preferably H or R, in which R has the meaning of: C(O)H; straight-chain or branched alkyl with 1 to 20 C atoms, which can be substituted by aryl having 6 to 10 C atoms in which the aryl group may be substituted by straight-chain or branched alkyl groups or alkoxy groups with 1 to 4 C atoms; straight-chain or branched hydroxyalkyl with 1 to 20 C atoms; straight-chain or branched alkoxy with 1 to 20 C atoms, which can be substituted by aryl having 6 to 10 C atoms; aryl with 6 to 10 C atoms; or straight-chain or branched alkylamino or dialkylamino with 1 to 20 C atoms. R within formula IIa is preferably: straight-chain or branched alkyl with 1 to 9 C atoms, which can be substituted by phenyl; straight-chain or branched hydroxyalkyl with 1 to 4 C atoms; straight-chain or branched alkoxy with 1 to 4 C atoms, which can be substituted by phenyl; phenyl; or straight-chain or branched dialkylamino with 1 to 4 C atoms. R within formula IIa is especially preferably methyl, tert.-butyl, dimethylamino, phenylpropyl, benzyloxy, phenyl or hydroxymethyl.

Compounds of formula IIb are preferred in which the substituents R' are located in the 4, 5, 6 or 7 position of the quinoline ring. R' is preferably H or R, in which R has the meaning of: straight-chain or branched alkyl with 1 to 20 C atoms, which can be substituted by aryl having 6 to 10 C atoms in which the aryl group may be substituted by straight-chain or branched alkyl groups or alkoxy groups with 1 to 4 C atoms; straight-chain or branched hydroxyalkyl with 1 to 20 C atoms; straight-chain or branched alkoxy with 1 to 20 C atoms, which can be substituted by aryl having 6 to 10 C atoms; aryl with 6 to 10 C atoms; or straight-chain or branched alkylamino or dialkylamino with 1 to 20 C atoms. Within formula IIb, R' is preferably H.

Compounds of formula IIc are preferred in which R' is H and $R^x$ is independently H, straight-chain or branched alkyl with 1 to 20 C atoms, which can be substituted by cycloalkyl having 5 to 6 C atoms or aryl having 6 to 10 C atoms in which the aryl group may be substituted by straight-chain or branched alkyl groups or alkoxy groups with 1 to 4 C atoms or by heteroaryl having 5 or 6 C atoms. Within the compounds of formula IIc, $R^x$ is preferably H, straight-chain or branched alkyl with 1 to 9 C atoms, which can be substituted by cyclohexyl or phenyl in which the phenyl group may be substituted by straight-chain or branched alkyl groups or alkoxy groups with 1 to 4 C atoms. $R^x$ is especially preferably H, methyl, tert.-butyl, n-heptyl, phenylmethyl, methoxyphenylmethyl, 2-phenylpropyl or cyclohexylmethyl.

Compounds of formula IId are preferred in which R' is preferably H or R, in which R has the meaning of: straight-chain or branched alkyl with 1 to 20 C atoms, which can be substituted by aryl having 6 to 10 C atoms in which the aryl group may be substituted by straight-chain or branched alkyl groups or alkoxy groups with 1 to 4 C atoms; straight-chain or branched hydroxyalkyl with 1 to 20 C atoms; straight-chain or branched alkoxy with 1 to 20 C atoms, which can be substituted by aryl having 6 to 10 C atoms; aryl with 6 to 10 C atoms; or straight-chain or branched alkylamino or dialkylamino with 1 to 20 C atoms; and $R^x$ is independently H, straight-chain or branched alkyl with 1 to 20 C atoms, which can be substituted by cycloalkyl having 5 to 6 C atoms or aryl having 6 to 10 C atoms in which the aryl group may be substituted by straight-chain or branched alkyl groups or alkoxy groups with 1 to 4 C atoms or by heteroaryl having 5 or 6 C atoms. Within formula IId, R' is preferably H. Within formula IId, $R^x$ is preferably H, straight-chain or branched alkyl with 1 to 9 C atoms, which can be substituted by cyclohexyl or phenyl in which the phenyl group may be substituted by straight-chain or branched alkyl groups or alkoxy groups with 1 to 4 C atoms. $R^x$ is especially preferably H, methyl, tert.-butyl, n-heptyl, phenylmethyl, methoxyphenylmethyl, 2-phenylpropyl or cyclohexylmethyl.

Compounds of formula IIe are preferred in which R' is H and R'" is H, straight-chain or branched alkyl or alkoxy with 1 to 4 C atoms or heteroaryl having 5 or 6 C atoms. Within the formula IIe, R'" is preferably H, methyl, ethyl, tert.-butyl, methoxy, ethoxy or pyridyl. R'" is especially preferably H.

Compounds of formula IIf are preferred in which R' is H and R* is independently H or straight-chain or branched alkyl having 1 to 4 C atoms. Within formula IIf, R* is preferably H, methyl, ethyl or tert.-butyl. R* is especially preferably H.

Compounds of formula IIg are preferred in which R' is H or R, in which R has the meaning of straight-chain or branched alkyl with 1 to 20 C atoms. Within IIg, R' is preferably H.

Compounds of formula IIIa are preferred in which R' is H or R, in which R has the meaning of straight-chain or branched alkyl with 1 to 20 C atoms; X is $CH_2$, O or NR; and R" is straight-chain or branched alkyl with 1 to 20 C atoms. Within formula IIIa, R' is preferably H. Within formula IIIa, X is preferably O. Within formula IIIa, R" is preferably methyl, ethyl, n-propyl or n-butyl. R" is especially preferably methyl.

Compounds of formula IIIb are preferred in which R' is H; and R" is independently straight-chain or branched alkyl with 1 to 20 C atoms. Within formula IIIb, R" is preferably independently methyl, ethyl, n-propyl or n-butyl. R" is especially preferably methyl.

Compounds of formula IIIc are preferred in which R' is H or R, in which R has the meaning of straight-chain or branched alkyl with 1 to 20 C atoms; and R" is straight-chain or branched alkyl with 1 to 20 C atoms. Within formula IIIc, R' is preferably H. Within formula IIIc, R" is preferably methyl, ethyl, n-propyl or n-butyl. R" is especially preferably methyl.

Compounds of formula IIId are preferred in which R' is H or R, in which R has the meaning of straight-chain or branched alkyl with 1 to 20 C atoms; Y is CH, N, $N^+R$ or $N^+$—$O^-$. Within formula IIId, R' is preferably H. Within formula IIId, Y is preferably CH, N or $N^+$—$O^-$.

Within the compounds of formulae IIa, IIb, IIc, IId, IIe, IIf, IIg, IIIa, IIIb, IIIc and IIId as preferred compounds for the compounds of formula I as described above, the compounds of formulae IIa, IIc, IId and IIIa are particularly preferred and the compounds of formulae IIa, IId and IIIa are very particularly preferred.

Compounds of formula I are represented through the following group of compounds such as pyridine-N-oxide, 4-methyl-pyridine-N-oxide, 4-tert.-butyl-pyridine-N-oxide, 4-(dimethylamino)pyridine-N-oxide, N-methyl-morpholine-N-oxide, 4-(1-phenylpropyl)-pyridine-N-oxide, 4-(phenylmethoxy)pyridine-N-oxide, pyrazine-N-oxide, 4-(phenyl)-pyridine-N-oxide, 4-(hydroxymethyl)-pyridine-N-oxide, 4-(formyl)-pyridine-N-oxide, trimethylamino-N-oxide, dimethyl-nonyl-amine-N-oxide, N-n-butyl-benzimidazole-3-oxide, N-benzyl-benzimidazole-3-oxide, N-[(4-methoxyphenyl)methyl]-benzimidazole-3-oxide, N-(2-phenylpropyl)-benzimidazole-3-oxide, N-[(2',2'-dimethyl)propy)]-benzimidazole-3-oxide, N-(cyclohexylmethyl)-benzimidazole-3-oxide or N-n-heptyl-benzimidazole-3-oxide.

The present invention relates furthermore to an electrolyte formulation comprising: at least one compound of formula I as described herein or preferably as described together with redox active species such as iodide/tri-iodide or Co(II)/Co(III) complex couples such as Co(II)/Co(III)(dbbip)$_2$ in which dbbip means 2,6-bis(1'-butylbenzimidazol-2'-yl)pyridine, Co(II)/Co(III)(bpy)$_3$ where bpy denotes bipyridine or alkylated bipyridine derivates thereof, the counter anion being either perchlorate, fluoroperfluoroalkylphosphate such as perfluoroethylpentafluorophosphate, or (fluoro)cyanoborate, particularly tetracyanoborate; preferably a redox couple of iodine and at least one iodide salt This electrolyte formulation can be used as an electrolyte for a dye sensitized solar cells.

In chemistry, an electrolyte is any substance containing free ions that make the substance electrically conductive. The most typical electrolyte is an ionic solution, but molten electrolytes and solid electrolytes are also possible. An electrolyte formulation according to the invention is therefore an electrically conductive medium, basically due to the presence of at least one substance that is present in a dissolved and or in molten state i.e. supporting an electric conductivity via motion of ionic species. However, the said electric conductivity may not be of the major relevance to the role of the electrolyte of a dye-sensitised solar cell. Therefore, the scope of this invention is not limited to highly conductive electrolyte media. The term electrolyte may be used for the term electrolyte formulation as well comprising all ingredients as disclosed for the electrolyte formulation.

The at least one compound of formula I as described or preferably described herein is typically used in concentrations in the range from 0.01 to 30 weight % (% w/w) within the electrolyte formulation, preferably from 0.1 to 20 weight %, more preferably 1 to 10 weight %.

Typical molar concentrations are from 0.8 to 10 M, preferably from 2 to 5 M. This molar concentration in the electrolyte may be achieved with one or more compounds of formula I, which are described or preferably described before.

For the purpose of the present invention, the molar concentration refer to the concentration at 25° C.

The electrolyte formulation of the invention comprises iodine ($I_2$). Preferably, it comprises from 0.01 to 50 weight %, more preferably 0.1 to 20 weight % and most preferably from 1 to 10 weight % of $I_2$.

The iodide salt consists of an inorganic or organic cation and r as anion. There exists no limitation to the kind of cation. However, to limit the amount of different cations in the electrolyte formulations, especially for DSC, organic cations shall be used such as organic compounds comprising a quaternary nitrogen atom, preferably cyclic organic cations such as pyridinium, imidazolium, triazolium, pyrrolidinium or morpholinium. Preferably, the electrolyte formulation comprises at least one iodide salt in which the organic cation is independently selected from the group of

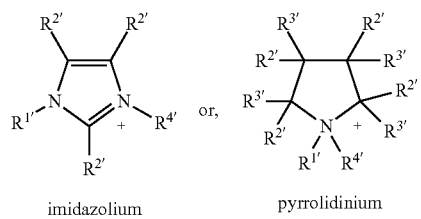

imidazolium        pyrrolidinium in which the substituents
$R^{2'}$ and $R^{3'}$ each, independently of one another, denote H or straight-chain or branched alkyl having 1 to 20 C atoms,
$R^{1'}$ and $R^{4'}$ each, independently of one another, denote straight-chain or branched alkyl having 1-20 C atoms, which optionally may be partially fluorinated or perfluorinated, straight-chain or branched alkenyl having 2-20 C atoms and one or more double bonds, which optionally may be partially fluorinated, straight-chain or branched alkynyl having 2-20 C atoms and one or more triple bonds, which optionally may be partially fluorinated.

Particularly preferred examples of the at least one iodide salt are 1-ethyl-3-methylimidazolium iodide (emim I), 1-propyl-3-methylimidazolium iodide (pmim I), 1-butyl-3-methyl-imidazolium iodide (bmim I), 1-hexyl-3-methylimidazolium iodide (hmim I), 1,3-dimethyl-imidazolium iodide (mmim I), 1-allyl-3-methylimidazolium iodide (amim I), N-butyl-N-methyl-pyrrolidinium iodide (bmpl I) or N,N-dimethyl-pyrrolidinium iodide (mmpl I).

Other components of the electrolyte formulation are one or several further salts or solvents or additives as indicated further below.

If the electrolyte formulation comprising the inventive additives of formula I, which are described and preferably described before, is a binary system, it comprises two salts, one further salt and one iodide salt as described above. If the electrolyte formulation is a ternary system, it comprises two further salts and a iodide salt or one further salt and two iodide salts as described above. The binary system comprises 90-20 weight %, preferably 70-25 weight %, more preferably 55-35 weight of the further salt and 10-80 weight %, preferably 30-75 weight % or more preferably 45-65 weight % of the iodide salt as described above. The percentages in this paragraph are expressed with respect to the total of salts (=100 weight %) present in the electrolyte formulation according to the invention.

Amounts of further, generally optional components (additives) indicated below, such as N-containing compounds having unshared electron pairs, solvents, polymers, and nanoparticles, for example, are not considered therein even though they can be present. The same percentages apply to ternary or quaternary systems which means the total of the further salts has to be used in the given ranges, e.g. two further ionic liquids are comprised in e.g. 90-20 weight. % in the electrolyte formulation according to the invention.

According to another embodiment of the present invention, the electrolyte formulation comprises at least one further salt with organic cations comprising a quaternary nitrogen and an anion selected from a halide ion, such as $F^-$, $Cl^-$, $I^-$, a polyhalide ion, a fluoroalkanesulfonate, a fluoroalkanecarboxylate, a tri(fluoroalkylsulfonyl)methide, a bis(fluoroalkylsulfonyl)imide, bis(fluorsulfonyl)imide, a nitrate, a hexafluorophosphate, a tris-, bis- and mono-(fluoroalkyl) fluorophosphate, a tetrafluoroborate, a dicyanamide, a tricyanomethide, a tetracyanoborate, a thiocyanate, an alkylsulfonate or an alkylsulfate, with fluoroalkane having 1 to 20 C atoms, preferably perfluorinated, fluoroalkyl having 1 to 20 C atoms and alkyl having 1 to 20 C atoms. Fluoroalkane or fluoroalkyl is preferably perfluorinated.

Preferably, the further salts are selected from salts comprising anions such as thiocyanate or tetracyanoborate, particularly preferred further salts are tetracyanoborates.

The cation of the at least one further salt or of a preferred further salt may be selected amongst organic compounds comprising a quaternary nitrogen atom, preferably cyclic organic cations such as pyridinium, imidazolium, triazolium, pyrrolidinium or morpholinium.

In another embodiment of the invention, guanidinium salts may be added to the electrolyte formulation according to the invention.

The following combinations of iodide salts and further salts often characterized as ionic liquids are preferred:
a) pmim I and emim TCB (1-propyl-3-methylimidazolium iodide and 1-ethyl-3-methylimidazolium tetracyanoborate)
b) pmim I, guanidinium thiocyanate and emim TCB
c) mmim I, emim I and emim TCB
d) mmim I, emimI guanidinium thiocyanate and emim TCB
e) mmim I, pmimI, guanidinium thiocyanate and emim TCB
f) mmim I, amimI, guanidinium thiocyanate and emim TCB.

The electrolyte formulation of the present invention may further comprise at least one compound containing a nitrogen atom having non-shared electron pairs as additional additive beside of the inventive compounds of formula I, as described or preferably described before, or tert.-butyl-pyridine. Examples of such compounds are found in EP 0 986 079 A2, starting on page 2, lines 40-55, and again from page 3, lines 14 extending to page 7, line 54, which are expressly incorporated herein by reference. Preferred examples of compounds having non-shared electron pairs include imidazole and its derivatives, particularly benzimidazole and its derivatives.

The electrolyte formulation of the present invention may comprise an organic solvent. Preferably, the inventive electrolyte formulation comprises less than 50% of an organic solvent. Particularly preferably, the electrolyte formulation comprises less than 40%, more preferably less than 30%, still more preferably less than 20% and even less than 10%. Most preferably, the electrolyte formulation comprises less than 5% of an organic solvent. For example, it is substantially free of an organic solvent. Percentages are indicated on the basis of weight %.

Organic solvents, if present in such amounts as indicated above, may be selected from those disclosed in the literature. Preferably, the solvent, if present, has a boiling point higher than 160 degrees centigrade, more preferably higher than 190 degrees such as propylene carbonate, ethylene carbonate, butylene carbonate, γ-butyrolactone, γ-valerolactone, glutaronitrile, adiponitrile, N-methyloxazolidinone, N-methylpyrrolidinone, N,N'-dimethylimidazolidinone, N,N-dimethylacetamide, cyclic ureas preferably 1,3-dimethyl-2-imidazolidinone or 1,3-dimethyl-3,4,5,6-tetrahydro-2(1H)-pyrimidinone, glymes preferably tetraglyme, sulfolane, sulfones which are preferably asymmetrically substituted such as 2-ethanesulfonyl-propane, 1-ethanesulfonyl-2-methyl-propane or 2-(propane-2-sulfonyl)-butane, 3-methylsulfolane, dimethylsulfoxide, trimethylphosphate and methoxy-substituted nitriles. Other useful solvents are acetonitrile, benzonitrile and or valeronitrile.

If a solvent is present in the electrolyte formulation, there may further be comprised a polymer as gelling agent, wherein the polymer is polyvinylidenefluoride, polyvinylidene-hexafluropropylene, polyvinylidene-hexafluoropropylene-chlorotrifluoroethylene copolymers, nafion, polyethylene oxide, polymethylmethacrylate, polyacrylonitrile, polypropylene, polystyrene, polybutadiene, polyethyleneglycol, polyvinylpyrrolidone, polyaniline, polypyrrole, polythiophene. The purpose of adding these polymers to electrolyte formulations is to make liquid electrolytes into quasi-solid or solid electrolytes, thus improving solvent retention, especially during aging.

The electrolyte formulation of the invention may further comprise metal oxide nanoparticles like $SiO_2$, $TiO_2$, $Al_2O_3$, MgO or ZnO, for example, which are also capable of increasing solidity and thus solvent retention.

The present invention therefore relates further to the use of the electrolyte formulation as described in detail above in a dye-sensitized solar cell.

The present invention therefore relates furthermore to a dye-sensitized solar cell comprising at least one compound of formula I as described or preferably described herein.

One preferred embodiment of the invention is the dye-sensitized solar cell as described above in which the at least one compound of formula I is contained in the electrolytic solution or, in other words, in which the at least one compound of formula I is part of the electrolytic formulation.

In dye-sensitized solar cells, a dye is used to absorb the sunlight to convert into the electrical energy. There are no restrictions per se with respect to the choice of the dye as long as the LUMO energy state is marginally above the conduction bandedge of the photoelectrode to be sensitized. Examples of dyes are disclosed in EP 0 986 079 A2, EP 1 180 774 A2 or EP 1 507 307 A1.

Preferred dyes are organic dyes such as MK-1, MK-2 or MK-3 (its structures are described in FIG. 1 of N. Koumura et al, J. Am. Chem. Soc. Vol 128, no. 44, 2006, 14256-14257), D102 (CAS no. 652145-28-3), D-149 (CAS no. 786643-20-7), D205 (CAS no. 936336-21-9), YD-2 as described in T. Bessho et al, Angew. Chem. Int. Ed. Vol 49, 37, 6646-6649, 2010, Y123 (CAS no. 1312465-92-1), bipyridin-Ruthenium dyes such as N3 (CAS no. 141460-19-7), N719 (CAS no. 207347-46-4), Z907 (CAS no. 502693-09-6), C101 (CAS no. 1048964-93-7), C106 (CAS no. 1152310-69-4), K19 (CAS no. 847665-45-6) or terpyridine-Ruthenium dyes such as N749 (CAS no. 359415-47-7).

Particularly preferred dyes are Z907 or Z907Na which are both an amphiphilic ruthenium sensitizer or D205. The dye Z907Na means $NaRu(2,2'$-bipyridine-4-carboxylic acid-4'-carboxylate$)(4,4'$-dinonyl-2,2'-bipyridine$)(NCS)_2$. The structure of D205 is

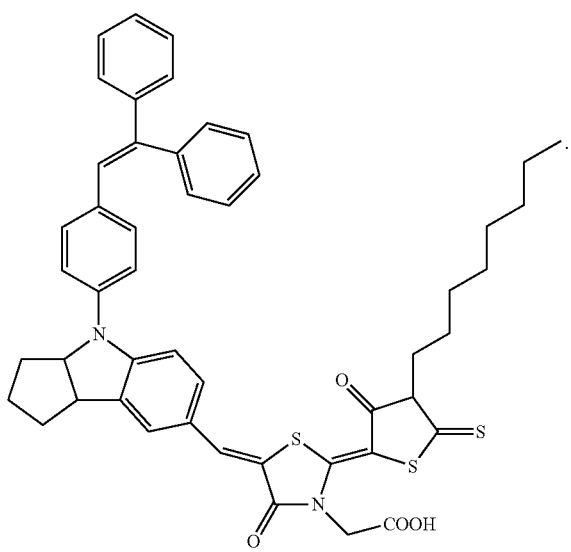 [SMILES: CCCCCCCCC1C(=O)/C(=c2\s/c(=C\c3ccc4c(c3)C3CCCC3N4c3ccc(C=C(c4ccccc4)c4ccccc4)cc3)c(=O)n2CC(=O)O)SC1=S]

Very particularly preferred dyes are Z907 or Z907Na.

In a preferred embodiment, the dye is coadsorbed with a phosphinic acid. A preferred example of a phosphinic acid is bis(3,3-dimethyl-butyl)-phosphinic acid (DINHOP) as disclosed in M. Wang et al, Dalton Trans., 2009, 10015-10020.

For example, a dye-sensitized solar cell comprises a photoelectrode, a counter electrode and, between the photoelectrode and the counterelectrode, an electrolyte formulation or a charge transporting material, and wherein a sensitizing dye is absorbed on the surface of the photoelectrode, on the side facing the counterelectrode.

According to a preferred embodiment of the device according to the invention, it comprises a semiconductor, the electrolyte formulation as described above and a counter electrode.

According to a preferred embodiment of the invention, the semiconductor is based on material selected from the group of Si, $TiO_2$, $SnO_2$, $Fe_2O_3$, $WO_3$, ZnO, $Nb_2O_5$, CdS, ZnS, PbS, $Bi_2S_3$, CdSe, GaP, InP, GaAs, CdTe, $CuInS_2$, and/or $CuInSe_2$. Preferably, the semiconductor comprises a mesoporous surface, thus increasing the surface optionally covered by a dye and being in contact with the electrolyte. Preferably, the semiconductor is present on a glass support or plastic or metal foil. Preferably, the support is conductive.

The device of the present invention preferably comprises a counter electrode. For example, fluorine doped tin oxide or tin doped indium oxide on glass (FTO- or ITO-glass, respectively) coated with Pt, carbon of preferably conductive allotropes, polyaniline or poly(3,4-ehtylenedioxythiophene) (PEDOT). Metal substrates such as stainless steel or titanium sheet may be possible substrates beside glass.

The device of the present invention may be manufactured as the corresponding device of the prior art by simply replacing the electrolyte by the electrolyte formulation of the present invention. For example, in the case of dye-sensitized solar cells, device assembly is disclosed in numerous patent literature, for example WO 91/16719 (examples 34 and 35), but also scientific literature, for example in Barbé, C. J., Arendse, F., Comte, P., Jirousek, M., Lenzmann, F., Shklover, V., Gratzel, M. J. Am. Ceram. Soc. 1997, 80, 3157; and Wang, P., Zakeeruddin, S. M., Comte, P., Charvet, R., Humphry-Baker, R., Gratzel, M. J. Phys. Chem. B 2003, 107, 14336.

Preferably, the sensitized semiconducting material serves as a photoanode. Preferably, the counter electrode is a cathode.

The present invention provides a method for preparing a photoelectric cell comprising the step of bringing the electrolyte formulation of the invention in contact with a surface of a semiconductor, said surface optionally being coated with a sensitizer. Preferably, the semiconductor is selected from the materials given above, and the sensitizer is preferably selected from quantum dots and/or a dye as disclosed above, particularly preferably selected from a dye.

Preferably, the electrolyte formulation may simply be poured on the semiconductor or it may be applied to the otherwise completed device already comprising a counter electrode by creating a vacuum in the internal lumen of the cell through a hole in the counter electrode and adding the electrolyte formulation as disclosed in the reference of Wang et al., J. Phys. Chem. B 2003, 107, 14336.

The invention relates also to novel compounds of formula IId

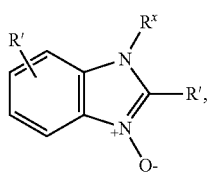

in which R' is H and

R<sup>x</sup> is independently straight-chain or branched alkyl with 6 to 20 C atoms or straight-chain or branched alkyl with 1 to 20 C atoms, which is substituted by cycloalkyl having 5 to 6 C atoms or aryl having 6 to 10 C atoms in which the aryl group can be substituted by straight-chain or branched alkyl groups or alkoxy groups with 1 to 4 C atoms or by heteroaryl having 5 or 6 C atoms with the condition that phenylmethyl is eccluded for $R^x$.

Novel compounds of formula IId are preferred, in which $R^x$ is preferably straight-chain or branched alkyl with 6 to 9 C atoms or methoxyphenylmethyl, 2-phenylpropyl or cyclohexylmethyl.

The following novel compounds of formula IId are particularly preferred: N-[(4-methoxyphenyl)methyl]-benzimidazole-3-oxide, N-(2-phenylpropyl)-benzimidazole-3-oxide, N-[(2',2'-dimethyl)propyl)]-benzimidazole-3-oxide, N-(cyclohexylmethyl)-benzimidazole-3-oxide or N-n-heptyl-benzimidazole-3-oxide.

The invention therefore also relates to a process for the preparation of compounds of the formula IId in which a) 2-nitroaniline is alkylated forming the intermediate of formula IV

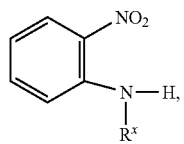

in which $R^x$ is defined as above and b) the compound of formula IV is formulated giving the intermediate V

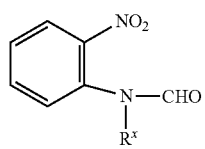

in which $R^x$ is as defined as herein, followed by a ring annulation reaction forming the compounds of formula IId.

The reaction of 2-bromonitrobenzene with $R^x$—NH$_2$, in which $R^x$ is defined as herein, is an alternative step to the described step a of the given process. This alternative step may be carried out in an organic solvent or in the absence of an organic solvent if one starting material is liquid at the reaction temperature, at a temperature between 10° C. and 200° C. A preferred solvent is DMSO. A preferred reaction temperature is 80° C.

Step a) of the process is an alkylation reaction of 2-nitroaniline with an alkylaldehyde $R^x$—CHO in the presence of an acid, an organic solvent and sodium triacetoxyborohydride. The reaction can be carried out at a temperature between 10° C. and 40° C., preferably at room temperature. Preferably, the acid is glacial acetic acid. Preferably, the organic solvent is dichloromethane.

All starting materials such as 2-bromonitrobenzene, the alkylamine $R^x$—NH$_2$, 2-nitro-aniline or the alkylaldehyde $R^x$—CHO, are commercially available.

The formulation of step b) can be carried out by reaction of the compound of formula IV, in which $R^x$ is defined as herein, with formic acid in the presence of acetic anhydride at a reaction temperature between 40 and 100° C., preferably at 70° C. Alternatively, the compound of formula IV can be reacted with formic acid at temperatures of 150° C. to 200° C., preferably at 160° C.

The ring annulation can be carried out through addition of a solution of ammonium sulfide to a solution of aqueous ethanol and the compound of formula V, in which $R^x$ is defined as herein or through addition of sodium borohydride to a suspension of palladium-charcoal in water and addition of the compound of formula V as defined above.

The reaction conditions of this kind of reaction are well known in the art. Exemplary reaction conditions are described in the experimental part below.

Even without further comments, it is assumed that a person skilled in the art will be able to utilize the above description in the broadest scope. The preferred embodiments and examples should therefore merely be regarded as descriptive disclosure which is absolutely not limiting in any way.

The synthesized compounds are characterized through NMR spectroscopy or elemental analysis. The NMR spectrum is measured in CDCl$_3$. Used frequencies: $^1$H: 399.78 MHz and $^{13}$C: 100.52 MHz, external references: TMS for $^1$H and $^{13}$C. $^1$H and $^{13}$C NMR spectra were recorded on a JEOL JNM-LA3000 spectrometer. All spectra were recorded at ambient temperatures.

Melting point experiments were performed on METTLER TOLEDO FP90 Central Processor and FP81 HT MBC Cell.

EXAMPLE 1

Synthesis of benzimidazole-N-oxides

Benzimidazoles N-oxide were prepared by three-step synthesis as shown in Scheme 1.

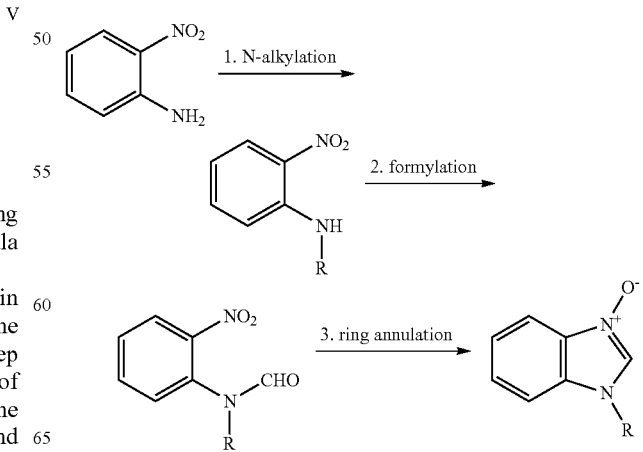

R within this reaction scheme is n-butyl for the synthesis of N-n-butyl-benzimidazole-3-oxide.

R within this reaction scheme is benzyl for the synthesis of N-benzyl-benzimidazole-3-oxide.

R within this reaction scheme is 4-methoxyphenylmethyl for the synthesis of N-[(4-methoxyphenyl)methyl]-benzimidazole-3-oxide.

R within this reaction scheme is 2-phenylpropyl for the synthesis of N-(2-phenylpropyl)benzimidazole-3-oxide.

R within this reaction scheme is 2',2'-dimethylpropyl for the synthesis of N-[(2',2'-dimethyl)propyl]-benzimidazole-3-oxide.

R within this reaction scheme is cyclohexylmethyl for the synthesis of N-(cyclohexylmethyl)-benzimidazole-3-oxide.

R within this reaction scheme is n-heptyl for the synthesis of N-n-heptyl-benzimidazole-3-oxide.

R within this reaction scheme is identical to the used term "alkyl" in alkylamine or alkylaldehyde in the following description of the process.

1. N-Alkylation of 2-Nitroaniline

Method A:

2-Bromonitrobenzene (5 g, 24.75 mmol) and alkylamine (91.58 mmol) were dissolved in DMSO (50 mL) and heated to 80° C. and stirred overnight. The reaction solution was then allowed to cool to room temperature before the addition of water (100 mL). The resulting solution was then extracted with toluene (3×50 mL) combined extracts were then washed with brine (3×20 mL) and dried over $MgSO_4$. Filtration and evaporation gave nitrophenylamine.

Method B:

To a solution of 2-nitrobenzeneamine (31.13 mmol), alkylaldehyde (88.64 mmol), glacial acetic acid (10 mL), and dichloromethane (144 mL) was added sodium triacetoxyborohydride (17 g, 77.83 mmol) and the reaction mixture was stirred at room temperature (48 h). Additional sodium triacetoxyborohydride (6.8 g, 31.13 mmol) was added and the solution was stirred at room temperature (24 h). The mixture was diluted with aqueous sodium bicarbonate (120 mL) and washed with AcOEt (4×120 mL). The combined organic phase was dried over MgSO4, filtered, and the solvents were removed at reduced pressure. The crude product was purified by distillation at 26.7 Pa.

2. N-Formulation of 2-(N-alkyl)nitroaniline

Method A:

To a solution of N-substituted 2-nitroaniline (61.78 mmol) and acetic anhydride (26 mL, 278.0 mmol) was added formic acid (5.2 mL, 139.0 mmol) and the reaction mixture was stirred at 70° C. for 9 h. Acetic anhydride and formic acid were removed at reduced pressure and the crude product was purified by distillation at 26.7 Pa.

Method B:

Into a 100 mL process vial equipped with a stirring bar are placed 2-nitroaniline (5.59 g, 39.66 mmol) and formic acid (21.8 mL, 579.8 mmol). The mixture was stirred at 160° C. (300 W) for 15 min. The reaction mixture is poured into water (100 mL), placed in an ice-bath for 30 min. and the resulting precipitate is isolated by filtration, washed with water (30 mL), and dried overnight at 50° C.

3. Ring Annulation

Method A:

A solution of ammonium sulfide $((NH_4)_2S_{(n)})$ was added to a solution of aqueous EtOH (100 mL) and N-substituted 2'-nitroformanilide (5 g). After standing overnight at room temperature, the resulting brown solution was concentrated to about 10 mL by nitrogen gas babbling under heating at 70° C. Precipitated sulfur was filtered off and washed with EtOH. After removal of EtOH from the combined filtrate and washings, diethylether was added to the residual oil. The resulting white crystals were collected by filtration and recrystallized from AcOEt/diethylether to give white prisms. From the filtrate N-substituted benzimidazole was obtained.

Method B:

A solution of sodium borohydride (5.3 g, 129.6 mmol) in water (4.3 mL) was added slowly, with stirring, to a suspension of palladium-charcoal (5%, 2.7 g) in water (36 mL). A solution of the 2-nitroformanilide (8.97 g, 53.99 mmol) in pyridine (86.4 mL) was added to this mixture, at such a rate that the temperature was maintained at 35-40° C. When the addition was completed (ca. 1 h), the mixture was stirred for a further 15 min. The catalyst was filtered off, and the filtrate was evaporated under reduced pressure. The residue was dissolved in water (ca. 70 mL) acidified (by conc. hydrochloric acid), then concentrated to approximately half volume and neutralized with aqueous ammonia before again being evaporated to dryness under reduced pressure. The residue was extracted with hot ethanol; the extract, when cooled, deposited inorganic material which was filtered off, and the filtrate was further concentrated and cooled to give the 1H-benzimidazole-3-oxide.

N-n-Butylbenzimidazole-3-oxide 4 (#128)

$^1$H NMR (400 MHz, $CDCl_3$) δ (ppm) 0.92 (t, J=7.3 Hz, 3H), 1.33 (sext., J=7.3 Hz, 2H), 1.82 (quint., J=7.3 Hz, 2H), 4.12 (t, J=6.9 Hz, 2H), 7.33-7.41 (m, 3H), 7.95 (d, J=7.8 Hz, 1H), 8.31 (s, 1H)

$^{13}$C NMR (100 MHz, $CDCl_3$) δ (ppm) 13.4, 19.7, 31.7, 45.6, 110.5, 114.5, 123.2, 125.9, 129.2, 130.2, 133.0

Melting point 124.5° C.

Yield 60%

N-Benzylbenzimidazole-3-oxide 5 (#137)

$^1$H NMR (400 MHz, $CDCl_3$) δ (ppm) 5.31 (s, 2H), 7.21-7.24 (m, 2H), 7.36-7.41 (m, 6H), 8.00 (d, J=8.2 Hz, 1H), 8.29 (s, 1H)

$^{13}$C NMR (100 MHz, $CDCl_3$) δ (ppm) 49.7, 110.8, 114.6, 123.5, 126.2, 127.4, 127.4, 128.9, 129.3, 129.4, 129.4, 130.4, 133.2, 133.7

Melting point 141.9° C.

Yield 49%

N-(4-Methoxyphenyl)methylbenzimidazole-3-oxide 6 (#141)

$^1$H NMR (400 MHz, $CDCl_3$) δ (ppm) 2.37 (s, 2H), 3.80 (s, 3H), 5.24 (s, 2H), 6.89 (d, J=8.7 Hz, 2H), 7.18 (d, J=8.7 Hz, 2H), 7.39-7.43 (m, 3H), 7.99 (d, J=8.7 Hz, 1H), 8.24 (s, 1H)

$^{13}$C NMR (100 MHz, CDCl$_3$) δ (ppm) 49.3, 55.3, 110.8, 114.5, 114.6, 114.6, 123.5, 125.4, 126.1, 129.0, 129.0, 129.3, 130.4, 133.1, 160.0
Melting point 116.9° C.
Yield 20%

N-(2-Phenylpropyl)benzimidazole-3-oxide 7 (#143: stereoisomeric mixture; major/minor=2.17:1)

major: $^1$H NMR (400 MHz, CDCl$_3$) δ (ppm)
1.41 (d, J=6.9 Hz, 3H), 3.35-3.41 (m, 1H), 4.42 (dd, J=8.2, 14.2 Hz, 1H), 4.53 (dd, J=8.2, 14.2 Hz, 1H), 7.14-7.7.30 (m, 8H), 7.88 (d, J=1.4 Hz, 1H), 9.19 (brs, 1H)
major: $^{13}$C NMR (100 MHz, CDCl$_3$) δ (ppm) 18.5, 40.5, 53.2, 107.8, 111.0, 121.1, 126.0, 127.1, 127.4, 128.5, 128.9, 129.1, 129.1, 131.5, 141.6, 155.3
minor: $^1$H NMR (400 MHz, CDCl$_3$) δ (ppm) 1.33 (d, J=7.3 Hz, 3H), 3.35-3.41 (m, 1H), 3.91 (dd, J=6.9, 14.2 Hz, 1H), 4.05 (dd, J=6.9, 14.2 Hz, 1H), 7.14-7.7.30 (m, 8H), 7.90 (d, J=2.3 Hz, 1H), 9.86 (brs, 1H)
minor: $^{13}$C NMR (100 MHz, CDCl$_3$) δ (ppm) 18.6, 38.8, 48.1, 109.3, 113.7, 120.9, 124.2, 126.9, 127.8, 127.4, 126.9, 126.7, 126.7, 133.4, 143.5, 155.3
Yield 36%

N-(2',2'-Dimethyl)propylbenzimidazole-3-oxide 8 (#147)

$^1$H NMR (400 MHz, CDCl$_3$) δ (ppm) 1.05 (s, 9H), 3.94 (s, 2H), 7.26-7.41 (m, 4H), 7.97 (d, J=0.91 Hz, 1H)
$^{13}$C NMR (100 MHz, CDCl$_3$) δ (ppm) 28.4, 28.4, 28.4, 35.0, 55.7, 111.2, 113.7, 122.9, 124.7, 129.8, 132.2, 140.5
Melting point 111.3° C.
Yield 51%

N-(Cyclohexylmethyl)benzimidazole-3-oxide 9 (#150)

$^1$H NMR (400 MHz, CDCl$_3$) δ (ppm) 0.95-1.04 (m, 2H), 1.10-1.27 (m, 3H), 1.63-1.76 (m, 5H), 1.82-1.85 (m, 1H), 3.97 (d, J=6.9 Hz, 2H), 7.39-7.43 (m, 3H), 8.00 (dt, J=1.4, 9.2 Hz, 1H), 8.22 (s, 1H)
$^{13}$C NMR (100 MHz, CDCl$_3$) δ (ppm) 25.4, 25.4, 25.9, 30.6, 30.6, 38.5, 52.1, 110.7, 114.5, 123.2, 125.9, 129.6, 130.5, 132.9
Melting point 152.5° C.
Yield 34%

N-n-Heptylbenzimidazole-3-oxide 10 (#196)

$^1$H NMR (400 MHz, CDCl$_3$) δ (ppm) 0.88 (t, J=6.9 Hz, 3H), 1.21-1.35 (m, 10H), 1.85, (t, J=7.3 Hz, 2H), 4.13 (t, J=6.9 Hz, 2H), 7.34-7.47 (m, 3H), 7.99 (dt, J=0.9, 9.2 Hz, 1H), 8.41 (s, 1H)
$^{13}$C NMR (100 MHz, CDCl$_3$) δ (ppm) 13.9, 22.4, 26.4, 28.5, 29.6, 31.4, 45.9, 110.5, 114.5, 123.2, 125.8, 129.2, 130.3, 132.9
Melting point 70.8° C.
Yield 55%

1H-Benzimidazole-3-oxide 11 (#200)

$^1$H NMR (400 MHz, DMSO-d$_6$) δ (ppm) 7.19 (dt, J=1.4, 7.3 Hz, 1H), 7.27 (dt, J=1.4, 7.3 Hz, 1H), 7.48, (dd, J=0.9, 6.9 Hz, 1H), 7.62 (dd, J=0.9, 6.9 Hz, 1H), 8.35 (s, 1H), 11.92 (brd.s, 1H)

$^{13}$C NMR (100 MHz, DMSO-d$_6$) δ (ppm) 108.8, 119.6, 121.5, 122.6, 131.3, 139.0, 139.6
Melting point 217.7° C. (decomposed) (lit. 215° C., decomposed)
Yield 13% (Method A), 7% (Method B)

EXAMPLE 2

Formulation and Device

The following electrolyte formulations are synthesized to demonstrate the unexpected advantage of electrolyte formulations by using benzimidazole N-oxides of formula IId.

The electrolyte formulations are prepared through mixing of 1,3-dimethylimidazolium iodide (mmimI) of 26%(w/w), 1-ethyl-3-methylimidazolium iodide (emimI) of 28%(w/w), 1-methyl-3-ethylimidazolium tetracyanoborate (emimTCB) of 36%(w/w), iodine of 4%(w/w), and an electrolyte additive of formula IId of 6%(w/w) such as 1H-benzimidazole N-oxide according to the invention. It may be necessary to apply heat up to 60° C. to make the electrolyte formulation homogeneous.

The compounds mmimI, emimI, I$_2$, and emimTCB are commercially available or may be synthesized based on known literature such as Bonhote, P et al. *Inorg. Chem.* 1996, 35, 1168-1178 or such as WO 2004/072089 for the synthesis of organic salts with tetracyanoborate anions.

The dye sensitized solar cells are fabricated as disclosed in U.S. Pat. No. 5,728,487 or WO 2007/093961:

A double-layer, mesoporous TiO$_2$ electrode is prepared as disclosed in Wang P. et al., *J. Phys. Chem. B* 2003, 107, 14336, in particular page 14337, in order to obtain a photoanode consisting of a double layer structure. To prepare a transparent nanoporous TiO$_2$ electrode, a screen printing paste containing terpineol solvent and nanoparticulate TiO$_2$ of anatase phase with 20-30 nm diameter was deposited on a transparent conductive substrate to 5 mm×5 mm squared shape by using a hand printer. The paste was dried for 10 minutes at 120 degrees Celsius. Another screen printing paste containing TiO$_2$ with 400 nm diameter was then deposited on top of the nanoporous layer to prepare an opaque layer. The double layer film was then sintered at 500 degrees Celsius for an hour with the result of an underlying transparent layer (7 microns thick) and a top opaque layer (4 microns thick). After sintering, the electrode was immersed in 40 mM aqueous solution of TiCl$_4$ (Merck) for 30 minutes at 70 degrees Celsius and then rinsed quickly with pure water sufficiently. Thus TiCl$_4$-treated electrode was dried at 500 degrees Celsius for 30 minutes just before dye sensitization. The electrode was dipped into a 0.3 mM Z907 dye solution of acetonitrile (Merck HPLC grade) and tert-butyl alcohol (Merck), v:v=1:1 for 60 hours at 19 degrees Celsius. The counter electrode was prepared with thermal pyrolysis method as disclosed in the reference above. A droplet of 5 mM solution of platinic acid (Merck) was casted at 8 μl/cm2 and dried on a conductive substrate. The dye sensitized solar cell was assembled by using 30 micron thick Bynel (DuPont, USA) hot-melt film to seal up by heating. The internal space was filled with each of the electrolyte formulations as described herein to produce the corresponding devices.

The dye Z907 is an amphiphilic ruthenium sensitizer Ru(2, 2'-bipyridine 4,4'-dicarboxylic acid) (4,4'-dinonyl-2,2'-bipyridine)(NCS)$_2$ or [Ru(H2dcbpy)(dnbpy)(NCS)$_2$].

In order to obtain accurate light intensity level, Air Mass 1.5 Global (AM1.5G) simulated sunlight was calibrated spectrally according to Seigo Ito et al. "Calibration of solar simulator for evaluation of dye-sensitized solar cells" Solar Energy Materials & Solar Cells 82 (2004) 421.

The measurements of photocurrent-voltage curves are carried out for devices placed on a black plate chilled down to 25° C. under 1 Sun illumination. A photomask of 4 mm×4 mm is placed on top of the fabricated devices to define the light projection area.

Energy conversion efficiency is generally the ratio between the useful output of an energy conversion machine and the input of light radiation, in energy terms, determined by using adjustable resistant load to optimize the electric power output.

Thus obtained photovoltaic parameters are summarized in Table 1. Control means without additive.

| substance number | control | 1 (NBB) | 2 (BenzIm) | 3 (NMB) | |
|---|---|---|---|---|---|
| $J_{sc}$ (mA/cm$^2$) | 9.35 | 9.48 | 8.91 | 8.44 | |
| $V_{oc}$ (V) | 0.59 | 0.64 | 0.68 | 0.68 | |
| FF | 0.67 | 0.75 | 0.73 | 0.76 | |
| Efficiency (%) | 3.4 | 4.4 | 4.4 | 4.4 | |

| substance number | 4 (#128) | 5 (#137) | 6 (#141) | 7 (#143) | 8 (#147) |
|---|---|---|---|---|---|
| $J_{sc}$ (mA/cm$^2$) | 9.91 | 9.88 | 10.55 | 10.35 | 10.93 |
| $V_{oc}$ (V) | 0.60 | 0.60 | 0.61 | 0.57 | 0.61 |
| FF | 0.73 | 0.62 | 0.63 | 0.73 | 0.64 |
| Efficiency (%) | 4.3 | 3.7 | 4.1 | 4.3 | 4.3 |

| substance number | 9 (#150) | 10 (#196) | 11 (#200) |
|---|---|---|---|
| Jsc (mA/cm2) | 9.56 | 9.69 | 10.49 |
| Voc (V) | 0.66 | 0.56 | 0.63 |
| FF | 0.67 | 0.71 | 0.67 |
| Efficiency (%) | 4.3 | 3.8 | 4.5 |

| Item No.# | Structure | Item No.# | Structure |
|---|---|---|---|
| 128 | benzimidazole N-oxide with n-butyl | 147 | benzimidazole N-oxide with neopentyl |
| 137 | benzimidazole N-oxide with benzyl | 150 | benzimidazole N-oxide with cyclohexylmethyl |
| 141 | benzimidazole N-oxide with 4-methoxybenzyl | 196 | benzimidazole N-oxide with n-heptyl |

-continued

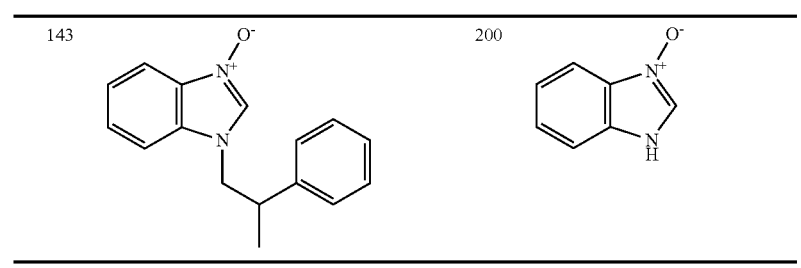

Within these measurements, 1H-benzimidazole N-oxide gives a higher efficiency than the additives N-butylbenzimidazole (NBB), benzimidazole (Benzim) and N-methylbenzimidazole (NMB).

EXAMPLE 3

Using the electrolyte containing N-oxide in the table, dye sensitized solar cells were fabricated according to the description in Example 2. Acetonitrile was used for solvent.

TABLE 2

| Electrolyte | Ex. 1 | Ex. 2 | Ex. 3 | Ref. 1 | Ref. 2 |
|---|---|---|---|---|---|
| Pmim-I | 0.6M | 0.6M | 0.6M | 0.6M | 0.6M |
| $I_2$ | 0.05M | 0.05M | 0.05M | 0.05M | 0.05M |
| 4-picoline N-oxide | 0.2M | 0.5M | saturated | 0M | — |
| NMB | — | — | — | — | 0.5M |

The results are shown in Table 3

TABLE 3

| | Average | | | | Deviation | | | |
|---|---|---|---|---|---|---|---|---|
| | $J_{sc}$/mA cm$^{-2}$ | $V_{oc}$/V | FF | % | $J_{sc}$/mA cm$^{-2}$ | $V_{oc}$/V | FF | % |
| Ex. 1 | 11.0 | 0.761 | 0.749 | 6.29 | 0.26 | 0.006 | 0.001 | 0.09 |
| Ex. 2 | 10.3 | 0.762 | 0.755 | 5.93 | 0.43 | 0.006 | 0.000 | 0.29 |
| Ex. 3 | 10.2 | 0.736 | 0.758 | 5.69 | 0.52 | 0.008 | 0.006 | 0.18 |
| Ref. 1 | 13.4 | 0.665 | 0.699 | 6.23 | 0.05 | 0.012 | 0.008 | 0.06 |
| Ref. 2 | 10.5 | 0.717 | 0.719 | 5.44 | 0.09 | 0.015 | 0.004 | 0.09 |

These results indicate that $V_{oc}$ and fill factor (FF) increased when 4-picoline N-oxide (which is synonymous to 4-methylpyridine-N-oxide) is contained in the solvent-based electrolyte for a dye-sensitized solar cell.

EXAMPLE 4

Using the electrolyte containing N-oxide in table 4, dye sensitized solar cells were fabricated according to the description of Example 2.

TABLE 4

| Molar ratio of the electrolyte formulation | | | | | |
|---|---|---|---|---|---|
| Electrolyte | Ex. 1 | Ex. 2 | Ex. 3 | Ref. 1 | Ref. 2 |
| pmim-I | 72 | 72 | 72 | 72 | 72 |
| $I_2$ | 5 | 5 | 5 | 5 | 5 |

TABLE 4-continued

| Molar ratio of the electrolyte formulation | | | | | |
|---|---|---|---|---|---|
| Electrolyte | Ex. 1 | Ex. 2 | Ex. 3 | Ref. 1 | Ref. 2 |
| emim-TCB | 16 | 16 | 16 | 16 | 16 |
| 4-picoline N-oxide | 2 | 5 | 10 | 0 | — |
| NMB | — | — | — | — | 10 |

The results are shown in Table 5.

TABLE 5

| | Average | | | | Deviation | | | |
|---|---|---|---|---|---|---|---|---|
| | $J_{sc}$/mA cm$^{-2}$ | $V_{oc}$/V | FF | % | $J_{sc}$/mA cm$^{-2}$ | $V_{oc}$/V | FF | % |
| Ex. 1 | 10.71 | 0.617 | 0.646 | 4.27 | 0.11 | 0.006 | 0.007 | 0.05 |
| Ex. 2 | 9.82 | 0.637 | 0.669 | 4.18 | 0.28 | 0.002 | 0.011 | 0.08 |
| Ex. 3 | 9.21 | 0.644 | 0.690 | 4.09 | 0.29 | 0.002 | 0.006 | 0.14 |
| Ref. 1 | 11.47 | 0.572 | 0.582 | 3.81 | 0.64 | 0.007 | 0.014 | 0.26 |
| Ref. 2 | 10.98 | 0.636 | 0.631 | 4.41 | 0.49 | 0.005 | 0.003 | 0.24 |

These results indicate that $V_{oc}$ and fill factor increased when 4-picoline N-oxide is contained in the ionic liquid-based electrolyte for dye-sensitized solar cells.

EXAMPLE 5

Using the electrolyte containing N-oxide in table 6, dye sensitized solar cells were fabricated. Molar ratio of the electrolyte formulation is: mmim-I 36/emim-I 36/I2 5/emim-TCB 48/An additive 2.

TABLE 6

| list of the used additives as part of the above described formulations with the above given molar ratios | |
|---|---|
| No. | name of additve |
| Ex. 1 | pyridine N-oxide |
| Ex. 2 | 4-picoline N-oxide |
| Ex. 3 | 4-tert-butylpyridine N-oxide |
| Ex. 4 | 4-dimethylaminopyridine N-oxide |
| Ex. 5 | 4-methylmorpholine N-oxide |
| Ex. 6 | 4-(3-Phenylpropyl)pyridine N-oxide |
| Ex. 7 | 4-(Benzyloxy)pyridine N-oxide |
| Ex. 8 | 4-pyrazine N-oxide |
| Ex. 9 | 4-phenylpyridine N-oxide |
| Ex. 10 | 4-pyridylcarbinol N-oxide |
| Ex. 11 | 4-Pyridinecarboxaldehyde N-oxide |
| Ex. 12 | Trimethylamine N-oxide |
| Ex. 13 | N,N-Dimethylnonylamine N-oxide |
| Ref. 1 | without additive |
| Ref. 2 | Pyridine |
| Ref. 3 | 4-picoline |
| Ref. 4 | 4-tert-butylpyridine |

TABLE 6-continued list of the used additives as part of the above described formulations with the above given molar ratios

| No. | name of additve |
|---|---|
| Ref. 5 | 4-dimethylaminopyridine |
| Ref. 6 | N-methylbenzimidazole |

All the N-oxides used here were commercially available.

The results are shown in Table 7.

TABLE 7

| | Average | | | | Deviation | | | |
|---|---|---|---|---|---|---|---|---|
| | $J_{sc}/\text{mA cm}^{-2}$ | $V_{oc}/\text{V}$ | FF | % | $J_{sc}/\text{mA cm}^{-2}$ | $V_{oc}/\text{V}$ | FF | % |
| Ex. 1 | 9.62 | 0.641 | 0.744 | 4.59 | 0.27 | 0.014 | 0.004 | 0.20 |
| Ex. 2 | 9.65 | 0.657 | 0.740 | 4.68 | 0.55 | 0.014 | 0.009 | 0.18 |
| Ex. 3 | 11.22 | 0.644 | 0.708 | 5.12 | 0.34 | 0.001 | 0.003 | 0.14 |
| Ex. 4 | 9.32 | 0.700 | 0.707 | 4.61 | 0.28 | 0.014 | 0.010 | 0.09 |
| Ex. 5 | 11.04 | 0.650 | 0.716 | 5.13 | 0.12 | 0.006 | 0.004 | 0.07 |
| Ex. 6 | 10.56 | 0.646 | 0.718 | 4.90 | 0.15 | 0.008 | 0.007 | 0.16 |
| Ex. 7 | 9.55 | 0.676 | 0.721 | 4.64 | 0.03 | 0.004 | 0.001 | 0.03 |
| Ex. 8 | 9.97 | 0.615 | 0.728 | 4.45 | 0.00 | 0.004 | 0.001 | 0.02 |
| Ex. 9 | 10.10 | 0.657 | 0.727 | 4.82 | 0.00 | 0.003 | 0.000 | 0.03 |
| Ex. 10 | 10.35 | 0.632 | 0.740 | 4.83 | 0.15 | 0.010 | 0.004 | 0.11 |
| Ex. 11 | 9.04 | 0.624 | 0.744 | 4.19 | 0.04 | 0.001 | 0.003 | 0.03 |
| Ex. 12 | 8.77 | 0.691 | 0.740 | 4.48 | 0.01 | 0.005 | 0.002 | 0.02 |
| Ex. 13 | 10.15 | 0.679 | 0.715 | 4.93 | 0.15 | 0.001 | 0.013 | 0.04 |
| Ref. 1 | 12.47 | 0.568 | 0.657 | 4.64 | 0.60 | 0.014 | 0.027 | 0.11 |
| Ref. 2 | 11.77 | 0.588 | 0.687 | 4.76 | 0.25 | 0.001 | 0.001 | 0.10 |
| Ref. 3 | 11.68 | 0.593 | 0.696 | 4.82 | 0.38 | 0.006 | 0.022 | 0.07 |
| Ref. 4 | 11.34 | 0.634 | 0.710 | 5.10 | 0.07 | 0.009 | 0.023 | 0.17 |
| Ref. 5 | 7.89 | 0.706 | 0.754 | 4.20 | 0.28 | 0.012 | 0.005 | 0.11 |
| Ref. 6 | 11.10 | 0.635 | 0.711 | 5.01 | 0.35 | 0.006 | 0.012 | 0.12 |

These results indicate that $V_{oc}$ and Fill factor increased when N-oxide substituent are included in the chemical structure in the ionic liquid-based electrolyte for Dye-sensitized solar cell. As in the paper from Kusama, the not only the binding constant but also for the dielectric constant of additive may affect the increase in Voc.

EXAMPLE 6

Using the electrolyte containing N-oxide in table 8, dye sensitized solar cells were fabricated. Molar ratio of the electrolyte formulation is mmim-I 36/emim-I 36/I2 5/emim-TCB 48/additive X as in the Table 2D-1.

TABLE 8

| No. | Name of additve | Molar ratio |
|---|---|---|
| Ex. 1 | 4-picoline N-oxide | 2 |
| Ex. 2 | 4-picoline N-oxide | 5 |
| Ex. 3 | 4-picoline N-oxide | 10 |
| Ex. 4 | 4-dimethylaminopyridine N-oxide | 2 |
| Ex. 5 | 4-dimethylaminopyridine N-oxide | 5 |
| Ex. 6 | 4-dimethylaminopyridine N-oxide | 10 |
| Ex. 7 | 4-methylmorpholine N-oxide | 2 |
| Ex. 8 | 4-methylmorpholine N-oxide | 5 |
| Ex. 9 | 4-methylmorpholine N-oxide | 10 |
| Ex. 10 | 4-(3-Phenylpropyl)pyridine N-oxide | 2 |
| Ex. 11 | 4-(3-Phenylpropyl)pyridine N-oxide | 5 |
| Ex. 12 | 4-(3-Phenylpropyl)pyridine N-oxide | 10 |

TABLE 8-continued

| No. | Name of additve | Molar ratio |
|---|---|---|
| Ref. 1 | without additive | 0 |
| Ref. 2 | N-methylbenzimidazole | 2 |
| Ref. 3 | N-methylbenzimidazole | 5 |
| Ref. 4 | N-methylbenzimidazole | 10 |

The results are shown in Table 9.

TABLE 9

| | Average | | | | Deviation | | | |
|---|---|---|---|---|---|---|---|---|
| | $J_{sc}/\text{mA cm}^{-2}$ | $V_{oc}/\text{V}$ | FF | % | $J_{sc}/\text{mA cm}^{-2}$ | $V_{oc}/\text{V}$ | FF | % |
| Ex. 1 | 9.65 | 0.657 | 0.740 | 4.68 | 0.55 | 0.014 | 0.009 | 0.18 |
| Ex. 2 | 8.10 | 0.690 | 0.766 | 4.28 | 0.05 | 0.001 | 0.003 | 0.00 |
| Ex. 3 | 8.24 | 0.685 | 0.762 | 4.31 | 0.15 | 0.000 | 0.002 | 0.07 |
| Ex. 4 | 7.89 | 0.706 | 0.754 | 4.20 | 0.28 | 0.012 | 0.005 | 0.11 |
| Ex. 5 | 7.20 | 0.710 | 0.757 | 3.87 | 0.16 | 0.002 | 0.006 | 0.11 |
| Ex. 6 | 7.02 | 0.724 | 0.755 | 3.83 | 0.33 | 0.004 | 0.003 | 0.15 |
| Ex. 7 | 11.04 | 0.650 | 0.716 | 5.13 | 0.12 | 0.006 | 0.004 | 0.07 |
| Ex. 8 | 10.07 | 0.664 | 0.725 | 4.84 | 0.39 | 0.006 | 0.009 | 0.20 |
| Ex. 9 | 7.42 | 0.724 | 0.718 | 3.85 | 0.10 | 0.005 | 0.006 | 0.01 |
| Ex. 10 | 10.56 | 0.646 | 0.718 | 4.90 | 0.15 | 0.008 | 0.007 | 0.16 |
| Ex. 11 | 10.25 | 0.652 | 0.689 | 4.61 | 0.24 | 0.001 | 0.018 | 0.23 |
| Ex. 12 | 9.30 | 0.664 | 0.708 | 4.36 | 0.46 | 0.007 | 0.029 | 0.00 |
| Ref. 1 | 12.47 | 0.568 | 0.657 | 4.64 | 0.60 | 0.014 | 0.027 | 0.11 |
| Ref. 2 | 11.10 | 0.635 | 0.711 | 5.01 | 0.35 | 0.006 | 0.012 | 0.12 |
| Ref. 3 | 10.74 | 0.644 | 0.724 | 5.01 | 0.36 | 0.004 | 0.005 | 0.17 |
| Ref. 4 | 9.96 | 0.659 | 0.725 | 4.76 | 0.01 | 0.006 | 0.012 | 0.13 |

These results indicate that $V_{oc}$ and Fill factor increased with the concentration of the exemplary N-oxides as described in table 8 in ionic liquid-based electrolyte formulations for dye-sensitized solar cells.

The invention claimed is:

1. A dye-sensitized solar cell comprising at least one compound of formula I

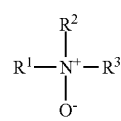

I wherein
$R^1$, $R^2$, $R^3$ are independently selected at each occurrence from:
straight-chain or branched alkyl with 1 to 20 C atoms, which can be substituted by at least one R; or
aryl with 6 to 10 C atoms, which can be substituted by at least one R,
or
$R^1$, $R^2$ and $R^3$ are fused to form a heteroaromatic ring structure in which 1, 2 or 3 N atoms or 1N atom and 1 S or 1 O atom are present which ring can be substituted by at least one R,
or
$R^1$ and $R^2$ are fused to form a heteroaliphatic ring structure in which 1, 2 or 3 N atoms or 1N atom and 1 S or 1 O atom are present which ring can be substituted by at least one R and $R^3$ is straight-chain or branched alkyl with 1 to 20 C atoms or fused to form a tricyclic structure containing at least 1 N atom and in which a second or third N atom of the heteroaliphatic ring structure or tricyclic ring structure may be substituted by —O⁻ and a straight-chain or branched alkyl with 1 to 20 C-atoms;

wherein a straight-chain or branched alkyl group having 1 to 20 C atoms is upon each occurrence independently selected from the group consisting of methyl, ethyl, propyl, isopropyl, n-butyl, sec.-butyl, tert.-butyl, 1-(2,2-dimethyl)-propyl, pentyl, hexyl, heptyl, octyl, x-methylbutyl with x being 1; 2 or 3 x-methylpentyl with x being 1; 2; 3 or 4 x-methylhexyl with x being 1; 2; 3; 4 or 5, x-ethylpentyl with x being 1, 2 or 3 x-ethylhexyl with x being 1; 2; 3 or 4 n-nonyl, n-decyl, n-undecyl, n-tridecyl, n-tetradecyl, n-pentadecyl, n-hexadecyl, n-heptadecyl, n-octadecyl, n-nonadecyl and n-eicosyl, which can be substituted by at least one R; and R is independently: Hal; CN; C(O)H; straight-chain or branched alkyl with 1 to 20 C atoms, which alkyl can be substituted by cycloalkyl having 5 to 6 C atoms or aryl having 6 to 10 C atoms in which the aryl group may be substituted by straight-chain or branched alkyl groups or alkoxy groups with 1 to 4 C atoms or by heteroaryl having 5 or 6 C atoms; straight-chain or branched alkenyl with 2 to 20 C atoms, which alkenyl can be substituted by aryl having 6 to 10 C atoms in which the aryl group may be substituted by straight-chain or branched alkyl groups with 1 to 4 C atoms; cycloalkyl having 5 or 6 C atoms; straight-chain or branched hydroxyalkyl with 1 to 20 C atoms; straight-chain or branched alkoxy with 1 to 20 C atoms, which alkoxy can be substituted by aryl having 6 to 10 C atoms; straight-chain or branched alkylthio with 1 to 20 C atoms; aryl with 6 to 10 C atoms in which the aryl group may be substituted by straight-chain or branched alkyl groups or alkoxy groups with 1 to 4 C atoms or by heteroaryl having 5 or 6 C atoms; heteroaryl with 5 to 10 C atoms in which a N atom of the heteroaryl group may be substituted by —O⁻; aryloxy with 6 to 10 C atoms; arylthio with 6 to 10 C atoms; straight-chain or branched alkylamino; or dialkylamino with 1 to 20 C atoms; and Hal is F, Cl, Br or I;

including all tautomeric or stereoisomeric forms thereof.

2. The dye-sensitized solar cell of claim 1, wherein: $R^1$, $R^2$ and $R^3$ are fused to form a heteroaromatic ring structure in which 1, 2 or 3 N atoms, or 1N and 1 S or 1 O atom are present, which heteroaromatic ring can be substituted by at least one R; or wherein $R^1$ and $R^2$ are fused to form a heteroaliphatic ring structure in which 1, 2 or 3 N atoms, or 1N atom and 1 S or 1 O atom are present, which heteroaliphatic ring can be substituted by at least one R; and $R^3$ is straight-chain or branched alkyl with 1 to 20 C atoms.

3. The dye-sensitized solar cell of claim 1, wherein:
a) the at least one compound of formula I is further defined as any compound of formula IIa to IIg

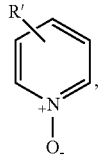
IIa

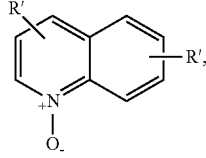
IIb

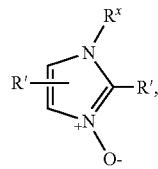
IIc

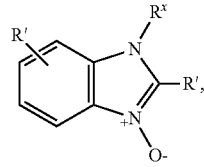
IId

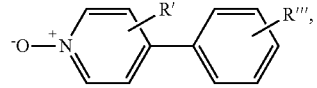
IIe

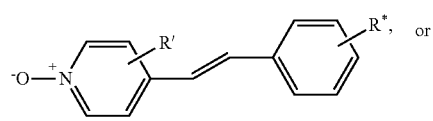
IIf or

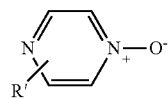
IIg wherein

R' is independently at each occurrence H or R;

R''' is independently selected at each occurrence from H, straight-chain or branched alkyl or alkoxy with 1 to 4 C atoms, or heteroaryl having 5 or 6 C atoms;

R* is independently selected at each occurrence from H, straight-chain or branched alkyl having 1 to 4 C atoms; and $R^x$ is independently selected at each occurrence from H, straight-chain or branched alkyl with 1 to 20 C atoms, which can be substituted by cycloalkyl having 5 to 6 C atoms or aryl having 6 to 10 C atoms in which the aryl group may be substituted by straight-chain or branched alkyl groups or alkoxy groups with 1 to 4 C atoms or by heteroaryl having 5 or 6 C atoms; or b) the at least one compound of formula I is further defined as any compound of formula IIa to IId

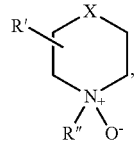
IIIa

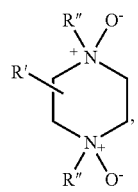
IIIb

-continued

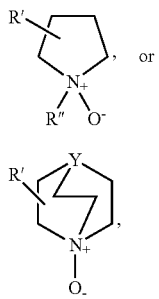

wherein
X is CH₂, O or NR;
Y is CH, N, N⁺R, or N⁺—O⁻;
R" is straight-chain or branched alkyl with 1 to 20 C atoms; and
R' is H or R.

4. The dye-sensitized solar cell of claim 3, wherein for the compound of Formula IIa R' is located in position-4 of the pyridine ring and is H or R, wherein R is selected from the group consisting of: C(O)H; straight-chain or branched alkyl with 1 to 20 C atoms, which can be substituted by aryl having 6 to 10 C atoms in which the aryl group may be substituted by straight-chain or branched alkyl groups or alkoxy groups with 1 to 4 C atoms; straight-chain or branched hydroxyalkyl with 1 to 20 C atoms; straight-chain or branched alkoxy with 1 to 20 C atoms, which can be substituted by aryl having 6 to 10 C atoms; aryl with 6 to 10 C atoms; or straight-chain or branched alkylamino or dialkylamino with 1 to 20 C atoms. R within formula IIa is preferably: straight-chain or branched alkyl with 1 to 9 C atoms, which can be substituted by phenyl; straight-chain or branched hydroxyalkyl with 1 to 4 C atoms; straight-chain or branched alkoxy with 1 to 4 C atoms, which can be substituted by phenyl; phenyl; and straight-chain or branched dialkylamino with 1 to 4 C atoms.

5. The dye-sensitized solar cell of claim 3, wherein for the compound of Formula IIb R' can be located in the 4, 5, 6 or 7 position of the quinoline ring and R' is H or R, wherein R is selected from the group consisting of: straight-chain or branched alkyl with 1 to 20 C atoms, which can be substituted by aryl having 6 to 10 C atoms in which the aryl group may be substituted by straight-chain or branched alkyl groups or alkoxy groups with 1 to 4 C atoms; straight-chain or branched hydroxyalkyl with 1 to 20 C atoms; straight-chain or branched alkoxy with 1 to 20 C atoms, which can be substituted by aryl having 6 to 10 C atoms; aryl with 6 to 10 C atoms; and straight-chain or branched alkylamino or dialkylamino with 1 to 20 C atoms.

6. The dye-sensitized solar cell of claim 3, wherein for the compound of Formula IIc R' is H, and $R^x$ is independently selected at each occurrence from H, straight-chain or branched alkyl with 1 to 20 C atoms, which can be substituted by cycloalkyl having 5 to 6 C atoms or aryl having 6 to 10 C atoms in which the aryl group may be substituted by straight-chain or branched alkyl groups or alkoxy groups with 1 to 4 C atoms or by heteroaryl having 5 or 6 C atoms.

7. The dye-sensitized solar cell of claim 3, wherein for the compound of Formula IId R' is H or R, wherein R is selected from the group consisting of: straight-chain or branched alkyl with 1 to 20 C atoms, which can be substituted by aryl having 6 to 10 C atoms in which the aryl group may be substituted by straight-chain or branched alkyl groups or alkoxy groups with 1 to 4 C atoms; straight-chain or branched hydroxyalkyl with 1 to 20 C atoms; straight-chain or branched alkoxy with 1 to 20 C atoms, which can be substituted by aryl having 6 to 10 C atoms; aryl with 6 to 10 C atoms; and straight-chain or branched alkylamino or dialkylamino with 1 to 20 C atoms; and R' is independently selected at each occurrence from the group consisting of H, straight-chain or branched alkyl with 1 to 20 C atoms, which can be substituted by cycloalkyl having 5 to 6 C atoms or aryl having 6 to 10 C atoms in which the aryl group may be substituted by straight-chain or branched alkyl groups or alkoxy groups with 1 to 4 C atoms or by heteroaryl having 5 or 6 C atoms.

8. The dye-sensitized solar cell of claim 3, wherein for the compound of Formula IIe R' is H; and R''' is H, straight-chain or branched alkyl or alkoxy with 1 to 4 C atoms or heteroaryl having 5 or 6 C atoms.

9. The dye-sensitized solar cell of claim 3, wherein for the compound of Formula IIf R' is H; and R* is independently selected at each occurrence from H or straight-chain or branched alkyl having 1 to 4 C atoms.

10. The dye-sensitized solar cell of claim 3, wherein for the compound of Formula IIg R' is H or R, wherein R is straight-chain or branched alkyl with 1 to 20 C atoms.

11. The dye-sensitized solar cell of claim 3, wherein for the compound of Formula IIa R' is H or R, wherein R is straight-chain or branched alkyl with 1 to 20 C atoms; X is CH₂, O or NR; and R" is straight-chain or branched alkyl with 1 to 20 C atoms.

12. The dye-sensitized solar cell of claim 3, wherein for the compound of Formula IIIb R' is H; and R" is independently selected at each occurrence from straight-chain or branched alkyl with 1 to 20 C atoms.

13. The dye-sensitized solar cell of claim 3, wherein for the compound of Formula IIIc R' is H or R, wherein R is straight-chain or branched alkyl with 1 to 20 C atoms; and R" is straight-chain or branched alkyl with 1 to 20 C atoms.

14. The dye-sensitized solar cell of claim 3, wherein for the compound of Formula IIId R' is H or R, wherein R is straight-chain or branched alkyl with 1 to 20 C atoms; Y is CH, N, N⁺R or N⁺—O⁻.

15. The dye-sensitized solar cell of claim 1, wherein the compound of formula I is independently selected at each occurrence from pyridine-N-oxide, 4-methyl-pyridine-N-oxide, 4-tert.-butyl-pyridine-N-oxide, 4-(dimethylamino)pyridine-N-oxide, N-methyl-morpholine-N-oxide, 4-(1-phenylpropyl)-pyridine-N-oxide, 4-(phenylmethoxy)pyridine-N-oxide, pyrazine-N-oxide, 4-(phenyl)-pyridine-N-oxide, 4-(hydroxymethyl)-pyridine-N-oxide, 4-(formyl)-pyridine-N-oxide, trimethylamino-N-oxide, dimethyl-nonyl-amine-N-oxide, N-n-butyl-benzimidazole-3-oxide, N-benzyl-benzimidazole-3-oxide, N-[(4-methoxyphenyl)methyl]-benzimidazole-3-oxide, N-(2-phenylpropyl)-benzimidazole-3-oxide, N-[(2',2'-dimethyl)propy)]-benzimidazole-3-oxide, N-(cyclohexylmethyl)-benzimidazole-3-oxide or N-n-heptyl-benzimidazole-3-oxide.

* * * * *